(12) United States Patent
Wallace et al.

(10) Patent No.: US 12,129,387 B2
(45) Date of Patent: Oct. 29, 2024

(54) STABLE INKJET DISPERSIONS AND INKS

(71) Applicant: SUN CHEMICAL CORPORATION, Parsippany, NJ (US)

(72) Inventors: Paul Wallace, Letchworth Garden City (GB); Ian Whitehead, Morges (CH); Yves Gentil, Morges (CH)

(73) Assignee: SUN CHEMICAL CORPORATION, Parsippany, NJ (US)

( * ) Notice: Subject to any disclaimer, the term of this patent is extended or adjusted under 35 U.S.C. 154(b) by 0 days.

(21) Appl. No.: 18/020,698

(22) PCT Filed: Jul. 13, 2022

(86) PCT No.: PCT/GB2022/051816
§ 371 (c)(1),
(2) Date: Feb. 10, 2023

(87) PCT Pub. No.: WO2023/285818
PCT Pub. Date: Jan. 19, 2023

(65) Prior Publication Data
US 2023/0312951 A1    Oct. 5, 2023

Related U.S. Application Data

(60) Provisional application No. 63/221,058, filed on Jul. 13, 2021.

(51) Int. Cl.
| | | |
|---|---|---|
| *C09D 11/102* | (2014.01) | |
| *B41J 2/01* | (2006.01) | |
| *B41J 2/21* | (2006.01) | |
| *B41J 3/407* | (2006.01) | |
| *B41M 5/00* | (2006.01) | |
| *C09D 11/10* | (2014.01) | |
| *C09D 11/32* | (2014.01) | |
| *C09D 11/322* | (2014.01) | |
| *C09D 11/38* | (2014.01) | |
| *C09D 153/00* | (2006.01) | |

(52) U.S. Cl.
CPC .............. *C09D 11/102* (2013.01); *B41J 2/01* (2013.01); *B41J 2/2107* (2013.01); *B41J 3/4078* (2013.01); *B41M 5/0023* (2013.01); *C09D 11/10* (2013.01); *C09D 11/32* (2013.01); *C09D 11/322* (2013.01); *C09D 11/38* (2013.01); *C09D 153/00* (2013.01)

(58) Field of Classification Search
CPC ... C09D 11/102; C09D 11/106; C09D 11/107; C09D 11/328; C09D 11/40; C09D 11/103; C09D 11/326; C09D 11/52; C09D 7/61; C09D 7/62; C09D 7/68; C09D 7/70; C09D 11/00; C09D 11/037; C09D 11/38; C09D 11/36; C09D 11/30; C09D 11/32; C09D 11/322; C09D 11/324; C09D 11/101; C09D 11/005; C09D 11/54; B41J 2/2107; B41J 2/01; B41J 2/211; B41J 2/1433; B41J 2/17; B41J 2/17593; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41M 5/0047; B41M 5/025; B41M 7/009; B41M 5/0023; B41M 5/0041; B41M 5/0011; B41M 5/0017; B41M 7/00; B41M 7/0072; B41M 5/52; B41M 5/5218; B41M 5/5227; D06P 1/0096; D06P 1/16; D06P 1/908; D06P 1/928; D06P 5/30; D06P 2001/906; D06P 1/5221; D06P 1/5257; D06P 1/5285; D06P 1/56; D06P 5/004; D06P 5/006; D06P 5/003; C09K 11/02; C09K 11/883; H01L 33/06; H01L 2933/0091; C08K 3/22; C08K 7/18; C08K 9/00; Y10T 29/49401

See application file for complete search history.

(56) References Cited

U.S. PATENT DOCUMENTS

| | | | | |
|---|---|---|---|---|
| 2003/0083396 | A1* | 5/2003 | Ylitalo | C09D 11/101 522/74 |
| 2008/0171149 | A1* | 7/2008 | Hastie | D06P 5/30 427/256 |
| 2012/0073633 | A1* | 3/2012 | Fujdala | H01L 31/03923 257/E31.004 |
| 2015/0361285 | A1* | 12/2015 | Breton | C09D 11/38 347/20 |
| 2017/0247554 | A1* | 8/2017 | Shields | C09D 11/101 |
| 2017/0335121 | A1* | 11/2017 | Shields | C09D 11/101 |

(Continued)

FOREIGN PATENT DOCUMENTS

| | | |
|---|---|---|
| DE | 10 2008 054531 A1 | 6/2010 |
| EP | 0064225 B1 | 11/1982 |

(Continued)

OTHER PUBLICATIONS

International Search Report issued in International Application No. PCT/GB2022/051816, mailed Oct. 26, 2022.

(Continued)

*Primary Examiner* — Manish S Shah
(74) *Attorney, Agent, or Firm* — Luke Sande

(57) ABSTRACT

The present invention provides a composition comprising a synergistic combination of at least three dispersant classes, which is used to produce ultra-stable disperse dye dispersions and inks having azo-functional colorants.

17 Claims, No Drawings

(56) References Cited

U.S. PATENT DOCUMENTS

| | | | | |
|---|---|---|---|---|
| 2018/0105714 A1* | 4/2018 | Kasperchik | .......... | C09D 11/322 |
| 2018/0194959 A1* | 7/2018 | Kasperchik | .......... | C09D 11/106 |
| 2018/0273787 A1* | 9/2018 | Herlihy | ................ | C09D 11/328 |
| 2019/0153230 A1* | 5/2019 | Hall | .......................... | D06P 1/18 |
| 2019/0207227 A1* | 7/2019 | Kelsall | ................ | H01M 8/1253 |
| 2019/0249022 A1* | 8/2019 | Ingle | .................... | C09D 11/322 |
| 2019/0284414 A1* | 9/2019 | Bruinsma | ............... | C09D 11/54 |
| 2019/0345354 A1* | 11/2019 | Huang | ................... | C09D 11/03 |
| 2020/0002557 A1* | 1/2020 | Matsuzawa | .......... | C09D 11/033 |
| 2020/0131698 A1 | 4/2020 | Fukumoto | | |

FOREIGN PATENT DOCUMENTS

| | | |
|---|---|---|
| JP | 2016175995 | 10/2016 |
| WO | WO2019054215 | 3/2019 |

OTHER PUBLICATIONS

Written Opinion of the International Searching Authority issued in International Application No. PCT/GB2022/051816, mailed Oct. 26, 2022.

\* cited by examiner

STABLE INKJET DISPERSIONS AND INKS

CROSS REFERENCE TO RELATED APPLICATIONS

The present application is a § 371 National Phase application based on PCT/GB2022/051816 filed Jul. 13, 2022, which claims the benefit of U.S. Provisional Application No. 63/221,058, filed Jul. 13, 2021, the subject matter of each of which is incorporated by reference in their entirety.

This application claims priority from U.S. provisional application 63/221,058, which is incorporated herein by reference.

FIELD OF THE INVENTION

The present invention relates to compositions comprising three different dispersing agents that work in synergy to stabilise azo-colorants. The invention further relates to methods of making and methods of printing the same.

BACKGROUND OF THE INVENTION

It is a known problem that azo-functional colorants, such as Disperse Orange 25, Disperse Brown 27, Disperse Blue 360, Disperse Violet 43 and Disperse Orange 30, are unstable colorants in water-based dispersions and inks. Typical modes of instability are sedimentation and colour shift, which result due to the cis/trans isomerisation of the dye or by photochemical degradation by free radicals. Attempts to prevent the degradation of azo-functional colorants using dispersants have been explored. However, the use of a combination of dispersants working synergistically to increase the stability of azo colorants has not yet been reported.

WO2019054215 relates to the use of a polymeric ethylene glycol (short-chain) in combination with a styrene/(meth) acrylic copolymer to generate dispersions of satisfactory storage stability and improved redispersibility. These properties presumably result from the inclusion of the water-miscible acid as well as the hydroxyl functional groups present on the two agents used. WO2019054215 aims to complex group 1 metal ions in inkjet inks in order to maintain a concentration of said ions below 6,800 ppm. WO2019054215 does not describe the stability problem which occurs with Disperse Orange 25 specifically. The glycols exemplified in WO2019054215 are of the general structure H—[O—CH(CH$_3$)CH$_2$]t-OH, where t=1 to 5 and thus have a molecular weight of at most <320 Daltons and are oligomers. There is no disclosure of an alkylnaphthalenesulfonate wherein the alkyl is hydrogen, methyl, or ethyl. There is also no disclosure of a non-ionic surfactant comprising amine substituents or of two different non-ionic polymeric dispersing agents.

EP0064225B1 describes the use of esterified oxalkylates as formulation agents for dyestuffs. EP0064225B1 describes the use of a non-ionic dispersing agent of the general structure [A-O—(X—O)$_n$—C(=O)]—R, wherein A is a hydrocarbon chain of 10 to 24 carbon atoms, X represents —CH$_2$—CH$_2$— or —CH$_2$—CH(R)CH$_3$)—, and R is a terminal aliphatic 1-carboxylic acid group, and an anionic dispersant from the class of alkylnaphthalenesulfonic acids. Dispersions prepared from the dispersant and alkylnaphthalenesulfonic acids were found to achieve reasonable stability in pastes used for traditional printing at particle sizes of 3 microns or less. However, there is no disclosure of a composition comprising two different non-ionic dispersing agents along with an alkylnaphthalenesulfonate or the synergistic combination of these agents in stabilizing azo-dyes. In particular, there is no disclosure of a stabilizing composition comprising a non-ionic surfactant with amine substituents.

JP2016175995 discloses a styrene-acrylic copolymer dispersing agent, an oligomeric glycol, and acetylenic diol derivatives, which can be used to form aqueous inkjet inks with excellent redispersability. Importantly, the dispersant has an acid value of 160 to 250 mgKOH/g, presumably to help with resolubility. JP2016175995 is concerned with resolubility, and jetting should the ink dry out on the nozzle plate. There is no reference to stability or printability improvements or performance. There is no disclosure of the use of an alkylnaphthalenesulfonate anionic surfactant or of a non-ionic dispersing agent comprising amine groups. There is also no disclosure of two non-ionic polymeric dispersing agents having different functionality.

SUMMARY OF THE INVENTION

The inventors report the use of a combination of functional dispersants to provide stable dispersions and inks comprising azo-functional colorants. In particular, the present invention provides a printing ink or pigment dispersion composition comprising a water-insoluble azo-functional colorant; at least two different functionality non-ionic dispersants; and an alkylnaphthalene sulfonate anionic surfactant with the alkyl being hydrogen, methyl, or ethyl.

The present invention also provides a printing ink or pigment dispersion composition comprising a water-insoluble azo-functional colorant; a first non-ionic polymer dispersing agent comprising water solubilizing polar groups; a second non-ionic polymer dispersing agent comprising a polyether (i.e., glycol repeating units) and amine groups/substituents; and an alkylnaphthalene sulfonate anionic surfactant with the alkyl being hydrogen, methyl, or ethyl.

The present invention also provides a printing ink or pigment dispersion composition comprising a water-insoluble azo-functional colorant; a first non-ionic polymer dispersing agent comprising water solubilizing polar groups; a second non-ionic polymer dispersing agent comprising a polyether (i.e., glycol repeating units) and amine groups; and an alkylnaphthalene sulfonate condensate with a structure comprising at least two naphthalene rings linked with either an ethylene group, a methylene group, or a direct C—C bond, wherein at least one of the naphthalene rings comprises a sulfonate group.

The present invention also provides a printing ink or pigment dispersion composition comprising a water-insoluble azo-functional colorant; a first non-ionic polymer dispersing agent that is a neutralised polycarboxylic acid; a second non-ionic polymer dispersing agent that is a poly (ethylene oxide)-b-poly(meth)acrylate block copolymer, wherein the poly(meth)acrylate block comprises amine groups; and an alkylnaphthalene sulfonate condensate with a structure comprising at least two naphthalene rings linked with either an ethylene group, a methylene group, or a direct C—C bond, wherein at least one of the naphthalene rings comprises a sulfonate group.

The inventors have discovered that this combination of dispersants provides stability to printing inks and dispersions comprising azo-functional colorants. Without wishing to be bound by theory, it is postulated that the use of the three different dispersants has a synergistic effect that creates ultra-stable disperse dye dispersions and inks, which extend the shelf-life from as little as three months to greater than 12 months. Moreover, it was found that the printability of the inks of the invention is superior to standard dispersant packages.

It is particularly preferred that the printing inks or pigment dispersions of the invention comprise a mixture of at least three different functional dispersants, one of which is non-ionic and comprises an amine-rich portion, one of which is non-ionic but with polar functional groups to impart water solubility, and one of which is an anionic naphthalenesulfonate.

DETAILED DESCRIPTION

Definitions

Azo colorant=organic compounds bearing the functional group R—N=N—R', in which R and R' may be aryl.

Unless otherwise stated, wt % refers to the mass of a particular component relative to the total mass of all components in the composition.

(Meth)acrylate refers to both acrylates and methacrylates. (Meth)acrylamide refers to both acrylamides and methacrylamides.

Boiling point=unless otherwise specified, all boiling points are measured under standard atmospheric pressure of 101 kPa.

Solubility is defined as the mass of substance in grams that will dissolve in 100 grams (i.e., 100 mL) of water. Thus, 20% (w/w) solubility corresponds to 20 g dissolved in 100mL.

Dispersing agent=a reagent that stabilises a non-soluble solid suspended in a liquid medium, reducing or preventing settling, separation, agglomeration, or aggregation. Dispersing agent and dispersant are used interchangeably throughout the application.

Non-ionic dispersing agent=a polymer that stabilises non-soluble solid particles through physical repulsive forces of the polymer chains, as well as osmotic pressure. Non-ionic dispersants adhere to non-soluble solid particles and the polymer chains swell to physically prevent the particles from agglomerating. Examples of non-ionic dispersants include polyethers and other hydrophilic polymers, which swell in aqueous media. Examples also include charged species, for example polyacids and neutralised polyacids, such as neutralised poly(meth)acrylic acids.

Ionic dispersing agent=charged species that stabilise non-soluble solid particles using electrostatic repulsion. Ionic dispersants adhere to the non-soluble solid particles to form an electric double layer that repels other particles, reducing or preventing agglomeration. In the context of the present invention, an anionic surfactant is an ionic dispersing agent from which a cation has delocalised, leaving a corresponding anion.

Self-crosslinking polymers. Self-crosslinking polymers contain a functionality which is self-reactive, and thus do not require the use of a separate co-reactant per se. A self-crosslinking polymer is usually in the form of an aqueous dispersion or emulsion. There are several mechanisms by which a polymer can be self-crosslinking. One mechanism is wherein the polymer has substituents of complementary reactivity distributed along the backbone (e.g. is the product of at least two monomers that can further react with one another after being incorporated into the polymer). For example, such a polymer may contain both a carbonyl and an amine functional group. Alternatively or in addition, self-crosslinking polymer emulsions can comprise crosslinkable functional groups attached to the polymer backbone in addition to a separate crosslinker (i.e. a polyfunctional species that reacts with said crosslinkable functional groups) that is retained in the emulsion until such time that crosslinking is initiated. Typically, in self-crosslinking polymer chemistry, polymers containing ketone groups crosslink at room temperature when combined with bi- or polyfunctional compounds that are reactive towards carbonyl. One example of these reactive compounds is bishydrazides. Such self-crosslinking polymers are provided as one pack products. The self-crosslinking reaction may also be initiated by the evaporation of water upon drying, a change of pH of the vehicle, or by curing at elevated temperatures, at which the cross-linking reaction occurs faster, or the reactive groups are de-blocked. In a preferred embodiment, the self-crosslinking polymers used in the present invention undergo self-crosslinking at room temperature (e.g. 25° C.). In other words, self-crosslinking polymers and polymer emulsions are species that undergo crosslinking when initiated by one of the above-mentioned methods, but otherwise can be stored long-term in a stable state without undergoing significant crosslinking. Self-crosslinking polymers and polymer emulsions do not require mixing with a further crosslinking agent in order to undergo crosslinking.

Disperse Dye=non-ionic, synthetic dyes intended for polyester and related hydrophobic fibres. The disperse dyes for use with the present invention comprise azo groups.

Invention

It is a known problem in the art that azo-functional colorants, such as Disperse Orange 25 and similar colorants, are unstable due to the capacity for the azo group to undergo cis/trans isomerisation. Cis/trans isomerization is the primary cause of instability in dispersions and inks comprising such colorants can cause significant color shift issues after the printed inks are printed and cured or processed by sublimation.

The inventors have discovered that a dispersion comprising at least two different functionality non-ionic dispersants in combination with an alkylnaphthalenesulfonate dispersant with the alkyl being hydrogen, methyl, or ethyl, provides inks and dispersions with superior stability. The inks and dispersions of the invention are for use in applications such as digital printing. The at least two non-ionic dispersants preferably include a dispersant that is a water-soluble polymer, such as SYNTHRO®-PON W599, as well as an amine functional dispersant, such as Bykjet-9171. The alkylnaphthalenesulfonate dispersant is an anionic surfactant, such as Oparyl DT505.

Mechanism of Stabilisation

The dispersion formulations of the invention incorporate three different dispersants that work in synergy to prevent cis/trans isomerization of the azo colorant. Each of the three dispersants plays a role in preventing this isomerization and is thus critical for overcoming the instability and color shift issues that normally affect inks and dispersions comprising these colorants. One dispersant prevents cis/trans isomerization that would otherwise occur due to free radical attack and rotation about the azo bond of the colorant. This dispersant (the first non-ionic dispersing agent) is typically an antioxidant or radical scavenger. A second dispersant prevents stabilization of the cis-isomer (once formed), which would otherwise occur due to complexation with metals or metal ions (such as di or trivalent metals) present in the dispersion or ink. This dispersant (the second non-ionic dispersing agent) is typically a dispersant with an amine-rich component. Finally, a third dispersant (the alkylnaphthalene sulfonate anionic surfactant) provides steric stability to the colorant particles and acts as a high temperature stabilizing aid to prevent cis/trans isomerization at elevated temperatures. High temperatures can be experienced during the milling process in the manufacture of the dispersions and in the mixing process to produce the inks.

Using one dispersant alone, such as a standard non-ionic dispersant or an amine-rich non-ionic dispersant, results in little or no improvement over other single dispersant systems. However, by understanding the underlying cause of azo-colorant instability, the inventors have identified a combination of dispersants that are effective in providing stable azo-colorant comprising inks and dispersions. In particular, the inks and dispersions of the invention comprise two non-ionic functional dispersants, one of which is preferably a polyether-based polyamine functional dispersant, in combination with an alkyl naphthalenesulfonic acid dispersant, wherein each dispersant is included for its intended decay prevention function.

Exemplary Inks and Dispersions of the Invention

The water-based dispersions and inks of the present invention comprise at least a water-insoluble azo-colorant; two non-ionic dispersants, wherein the first non-ionic dispersant may have acid-functional groups for water solubility and the second non-ionic dispersant may have water solubility from a glycol backbone as well as amine-rich functionality; and a third anionic dispersant that is an alkylnaphthalene sulfonate anionic surfactant with the alkyl being hydrogen, methyl, or ethyl. The inks and dispersion of the invention may further comprise water; an organic solvent; and optionally an additional surfactant and biocide.

The pigment dispersion of the present invention may be in the form of a water-based dye, or pigmented ink set comprising the dispersion mentioned previously; as well as optionally: a rheology modifying polymer selected from the classes of poly(acrylic acid), styrene/acrylic acid copolymers, styrene/maleic acid copolymers, styrene/maleic acid/alkyl acrylate copolymers, styrene/methacrylic acid copolymers, styrene/methacrylic acid/alkyl acrylate copolymers, styrene/maleic half ester copolymers, vinyl naphthalene/acrylic acid copolymers, vinyl naphthalene/maleic acid copolymers as co-polymer, vinylpyrrolidinone polymers, polyurethane polymers and polyurethane co-polymers; water; an organic solvent; optionally a further biocide, and optionally an additional surfactant.

The pigment dispersion of the invention may be in the form of a series of aqueous dye or pigment inks for use in printing onto rigid and flexible substrates enabling high line speed digital decoration (up to 100 m/min, such as greater than 50 m/min, greater than 70 m/min, or greater than 90 m/min) of said substrates with superior print quality compared to inks prepared using other dispersants. Either scanning mode or fixed array mode can be used in the printing process.

Ink and Dispersion Components

Non-Ionic Dispersing Agents

The inks and dispersions of the present invention comprise two non-ionic dispersants wherein the dispersants have different functionality. By different functionality it is meant that the two non-ionic dispersing agents stabilise azo-dyes through different mechanisms.

First Non-Ionic Dispersant

The first non-ionic polymeric dispersing agent used in the present invention preferably comprises hydrophilic, water-solubilizing groups. The first non-ionic dispersing agent may be a co-polymer or block co-polymer having hydrophilic and hydrophobic functionality incorporated within.

The first non-ionic polymeric dispersing agent is most preferably a polycarboxylic acid, such as a neutralised polycarboxylic acid. Examples include poly(meth)acrylic acids.

The first non-ionic polymeric dispersing agent may also be a polyether, such as polyethers based on poly(ethylene oxide) or poly(propylene oxide) co-polymers. The first non-ionic polymeric dispersing agent may be a copolymer comprising a polycarboxylic acid, such as a neutralised polycarboxylic acid and a polyether, such as poly(ethylene oxide) or poly(propylene oxide). The first non-ionic polymeric dispersing agent may be block copolymer comprising blocks formed of the aforementioned components.

The number average molecular weight of the first non-ionic dispersing agent is above 1000 Da and preferably above 3,000 Da, such as above 4,000 Da, or above 6,000 Da. The number average molecular weight of the second non-ionic polymeric dispersing agent may be between 1,000 and 20,000 Da, and preferably between 2,000 and 16,000 Da, such as between 3,000 and 14,000 Da, such as between 5,000 and 12,000 Da, and more preferably between 5,000 and 10,000 Da, such as between 6,000 and 8,000 Da, or around 7,000 Da.

The first non-ionic dispersing agent is most preferably a neutralised polycarboxylic acid with a molecular weight between 5,000 and 12,000 Da, such as between 6,000 and 8,000 Da, or around 7,000 Da.

Examples of suitable commercial polymeric dispersants include, but are not limited to, SYNTHRO®-PON W578, SYNTHRO®-PON W 597, SYNTHRO®-PON W 599, SYNTHRO®-PON W 600 (from Synthron), Additol VXW 6208, Additol XL 255 N, Additol XW 6565, (Allnex), Solsperse™ 20000, Solsperse™ 27000, Solsperse™ 40000, Solsperse™ 43000, Solsperse™ 450000, Solsperse™ 46000, Solsperse™ J400, Solsperse™ W320, Solsperse™ WV400, Solsperse™ W100, Solsperse™ W200 (Lubrizol).

Second Non-Ionic Dispersing Agent

The second non-ionic dispersing agent used in the present invention preferably comprises amine-rich portions. The second non-ionic dispersing agent more preferably comprises amine substituents distributed along the polymer chain. The amine substituents can be tertiary amines.

The second non-ionic dispersing agent is preferably a co-polymer or block co-polymer having hydrophilic and hydrophobic functionality and an affinity for metals and metal ions incorporated within. By affinity for metals and metal ions, it is meant that the dispersing agent comprises functional groups, such as amines, capable of complexation with metals and metal ions (such as di- or trivalent metal ions). The second non-ionic polymeric dispersing agent is preferably based on a polyether. The second non-ionic polymeric dispersing agent class is more preferably based on poly(ethylene oxide) or poly(propylene oxide) co-polymers. The second non-ionic dispersing agent is even more preferably based on poly(ethylene oxide).

The second non-ionic dispersing agent is preferably a copolymer, such as a diblock copolymer or triblock terpolymer, comprising a polyether block. The copolymer preferably further comprises a coblock based on poly(meth) acrylate.

The second non-ionic dispersing agent is most preferably a diblock copolymer comprising a polyether block, such as a poly(ethylene glycol) block, and a poly(meth)acrylate block, such as a polyacrylate block, comprising amine groups.

Without wishing to be bound by theory, the second non-ionic dispersing agent prevents the stabilisation of the cis-isomer of the azo-dye that results following cis/trans isomerisation, which would otherwise occur due to the presence of metal ions in the composition. In particular, the second non-ionic dispersing agent complexes di-valent and tri-valent metal ions, such as $Ca^{2+}$ and $Fe^{3+}$, which would otherwise act as nucleation sites and bind to 2 or 3 dye molecules. Thus, it is preferred that the second non-ionic dispersing agent for use in the invention is capable of complexing di and tri-valent metal ions.

The number average molecular weight of the second non-ionic dispersing agent is above 1,000 Da, and preferably above 3,000 Da, such as above 5,000 Da, or above 8,000 Da. The number average molecular weight of the second non-ionic dispersing agent may be between 1,000 and 20,000 Da, and preferably between 3,000 and 18,000 Da, such as between 5,000 and 15,000 Da, such as between 6,000 and 14,000 Da, and more preferably between 7,000 and 12,000 Da, such as between 9,000 and 11,000 Da, or around 9,000-10,000 Da.

The second non-ionic dispersing agent preferably has an amine value of greater than 5 mg KOH/g. and more preferably greater than 10 mg KOH/g, such as greater than 15 mg KOH/g, or more preferably greater than 20 mg KOH/g, such as greater than 25 mg KOH/g. The second non-ionic dispersing agent preferably has an amine value of between 5 and 80 mg KOH/g, such as between 10 and 60 mg KOH/g, or more preferably between 15 and 50 mg KOH/g, such as between 20 and 40 mg KOH/g, or between 25 and 35 mg KOH/g, or around 28 mg KOH/g.

The second non-ionic polymeric dispersing agent has a solubility in water of at least 20% (w/w). Solubility is defined as the mass of substance in grams that will dissolve in 100 grams (i.e., 100 mL) of water. Thus, 20% (w/w) solubility corresponds to 20 g dissolved in 100 mL. The second non-ionic polymeric dispersing agent may have a solubility in water of at least 40% (w/w), such as at least 50%, at least 70%, at least 80%, or at least 90%.

Examples of suitable commercial polymeric dispersants for use as the second non-ionic dispersing agent include but are not limited to BYKJET-9171 (Altana), Solsperse™ 5000S, Solsperse™ 12000S, Solsperse™ 22000 (Lubrizol).

Types of Non-Ionic Dispersants

The non-ionic polymeric dispersing agents used in the present invention may be a co-polymer or block co-polymer having hydrophilic and hydrophobic functionality incorporated within it. The co-polymers may be based on copolymers selected from the group consisting of fatty alcohol alkoxylates, fatty acid alkoxylates, fatty amine alkoxylates, polyglycerol alkyl ethers, glucosyl dialkyl ethers, crown ethers, ester-linked dispersants, polyoxyethylene alkyl amide, polyoxyethylene alkyl phenol ether, sorbitol anhydride fatty acid esters, polyoxyethylene ether, or non-ionic block co-polymers. These copolymers can form part of the first and/or second non-ionic dispersing agents. For example, the above-mentioned copolymers can form part of (i.e. be co-monomers in) a first non-ionic dispersing agent comprising a neutralised polycarboxylic acid. In addition, the above-mentioned copolymers can form part of (i.e. be co-monomers in) a second non-ionic dispersing agent comprising a polyether. For example, the above-mentioned copolymers can form a coblock in a di or triblock copolymer comprising a polyether block, as used as the second non-ionic dispersing agent.

Examples of non-ionic dispersants include, but are not limited to Amadol CMA 5, Amadol CMA 8, Amadol CMA 12, Amadol OMA 4W, Berol 185, Ethylan 954 LQ, GT 2624, Aclosperse 747 (Nouryon), ECO Brij S20, ECO Brij S2, ECO Brij S100, ECO Brij S10, ECO Brij O5, ECO Brij O20, ECO Brij O2 (Croda), Solsperse 27000, Solsperse 54000 (Lubrizol), Disperbyk 190, Bykjet 9142, Bykjet 9152, Bykjet 9171 (Altana), Edaplan® 397, Edaplan® 397R, Edaplan® 470, Edaplan® 472, Edaplan® 480, Edaplan® 482, Edaplan® 490, Edaplan® 492, Edaplan® 494 (Munzing), Synthro®-pon W 578, Synthro®-pon W 597, Synthro®-pon W 599, Synthro-pon S 656, Synthro-pon S 670 (Synthron), These copolymers can form part of the first and/or second non-ionic dispersing agents. For example, the above-mentioned copolymers can form part of (i.e. be co-monomers in) a first non-ionic dispersing agent comprising a neutralised polyacid. In addition, the above-mentioned copolymers can form part of (i.e. be co-monomers in) a second non-ionic dispersing agent comprising a polyether. For example, the above-mentioned copolymers can form a coblock in a di or triblock copolymer comprising a polyether block, used as the second non-ionic dispersing agent.

Third Dispersant (Anionic)

The third ionic dispersing agent used in the present invention is an anionic alkylnaphthalenesulfonate with the alkyl being hydrogen, methyl, or ethyl.

It would be understood that, in the context of the present invention, an alkylnaphthalenesulfonate refers to an alkylnaphthalenesulfonate condensate with a structure comprising at least two naphthalene rings linked with an alkyl group, wherein at least one of the naphthalene rings comprises a sulfonate group. Each naphthalene ring may comprise a sulfonate group. Furthermore, it would also be understood that when the alkyl group is ethyl or methyl, this means that the linker between the naphthalene groups is an ethylene group ($—CH_2CH_2—$) or a methylene group ($—CH_2—$), respectively. Moreover, when the alkyl group is hydrogen, this means that the linker between the naphthalene groups is a C—C bond directly connecting the two naphthalene groups. Thus, methylnaphthalene sulfonate refers to a naphthalene sulfonate condensate wherein the linker between the two naphthalene rings is a methylene group and at least one of the naphthalene rings comprises a sulfonate group.

Preferably the linker between the naphthalene rings is either hydrogen (i.e., direct C—C bond) or methyl.

The alkylnaphthalenesulfonate condensate for use in the invention may be an oligomer comprising up to 10 naphthalene rings, such as preferably up to 5 naphthalene rings. More preferably the alkylnaphthalenesulfonate condensate for use in the invention is a dimer or a trimer.

Each of the naphthalene rings can further comprise one or more additional alkyl substituents, such as methyl, ethyl, propyl such as isopropyl, or butyl groups.

The alkylnaphthalenesulfonate used as the third ionic dispersing agent may have the following structure:

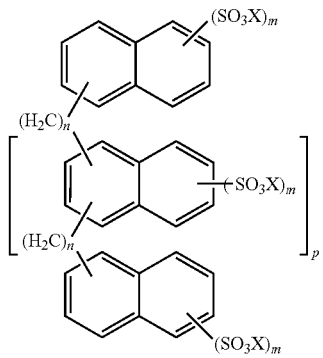

Formula 1: Structure of the Third Ionic Dispersing Agent for Use in the Invention In formula 1: n is 0, 1, or 2; m is 0 or 1 with the proviso that at least one m is 1; p is between 0 and 8; and X is any suitable cation, such as an alkali metal cation.

Preferably, p is between 0 and 5, such as between 0 and 3, between 0 and 2, or more preferably either 0 or 1.

Preferably, X is selected from the group consisting of $Li^+$, $Na^+$, $K^+$.

Preferably, n is 0 or 1.

Each naphthalene ring may comprise a sulfonate groups (i.e. each m=1). Each naphthalene group may comprise one or more $C_1$-$C_6$ alkyl substituents.

In addition to the alkylnaphthalene sulfonate, the free acid form may also be present (i.e. alkylnaphthalene sulfonic acid). For example, a compound of Formula 1 wherein X=H may also be incorporated into the compositions of the invention.

Those skilled in the art will appreciate that the third anionic dispersing agent can be a mixture of compounds each satisfying the requirements of Formula 1. Furthermore, it will be appreciate that the compounds of Formula 1 are not limited to those compounds wherein the alkyl linker and the sulfonate group are positioned on different benzene rings of each naphthalene ring. Accordingly, Formula 1 includes compounds wherein the alkyl linker and the sulfonate group are on the same benzene ring of the naphthalene ring.

The length of the linking group between the naphthalene rings was found to be of particular importance for stabilization. Thus, when the alkyl substituent between the naphthalene rings is an ethyl group (i.e. an ethylene linker, n=2), a methyl group (i.e. a methylene linker; n=1), or a hydrogen (i.e. a direct linker; n=0), as used in the invention, the resulting inks were found to have good stability (i.e. the azo-functional colorant was found to be stable and not degrade, such that the particle sizes do not significantly change over time) and to provide inks that can be filtered quickly. In contrast, when the alkyl substituent was increased to a propyl, butyl, or greater alkyl linker (i.e. n≥3), the resulting inks were found to be less stable (i.e. undergo particle size increases over time) and to provide inks that have long filtration times or that could not be filtered.

It is preferred that greater than 50 mol % of the naphthalene species present in the composition, such as greater than 60 mol %, greater than 70 mol %, more preferably greater than 80 mol %, is an alkylnaphthalenesulfonate with the alkyl being hydrogen, methyl, or ethyl. In other words, it is preferred than greater than 50 mol % of the naphthalene species present in the composition, such as greater than 60 mol %, greater than 70 mol %, more preferably greater than 80 mol %, satisfy Formula 1.

Examples of suitable commercial ionic polymeric dispersing agents for use in the invention include but are not limited to B0730 Sodium alkylnaphthalenesulfonate (TCI Chemicals), Oparyl DT120, Oparyl DT201, Oparyl DT320, Oparyl DT505 (Bozzetto), Pelex NBL (Kao).

Amounts of Dispersants

In the inks and dispersions of the invention, the first and second non-ionic surfactants, independently, are preferably incorporated into the ink or dispersions in amounts of up to 20 wt %, such as up to 15 wt %, up to 10 wt %, up to 8 wt %, or up to 5 wt %. In the inks and dispersions of the invention, the first and second non-ionic surfactants independently are preferably incorporated into the inks or dispersions in amounts of between 0.01 wt % and 20 wt %, such as between 0.01 and 15 wt % or 1 wt % and 15 wt %, or between 0.01 and 10 wt %. The first and second non-ionic surfactants independently are more preferably incorporated into the inks or dispersions in amounts between 0.5 wt % and 8 wt %, such as between 1 wt % and 6 wt % and even more preferably between 2 wt % and 5 wt %.

In the inks of the invention, the first and second non-ionic surfactants, independently, are preferably incorporated into the inks in amounts of up 15 wt %, such as up to 10 wt %, up to 8 wt %, up to 5 wt %, or up to 3 wt %. In the inks of the invention, the first and second non-ionic surfactants independently are preferably incorporated into the inks in amounts between 0.01 wt % and 10 wt %, such as between 0.01 and 8 wt % or 0.1 wt % and 7 wt %, or between 0.1 and 5 wt %. The first and second non-ionic surfactants independently are more preferably incorporated into the inks in amounts between 0.2 wt % and 5 wt %, such as between 0.2 wt % and 3 wt % and even more preferably between 0.5 wt % and 2 wt %.

In the inks and dispersions of the invention, the alkylnaphthalene sulfonate anionic surfactant may be incorporated into the inks or dispersions in an amount of up to 15 wt %, such as up to 10 wt %, up to 8 wt %, up to 5 wt %, or up to 3 wt %. In the inks and dispersions of the invention, the alkylnaphthalene sulfonate anionic surfactant is preferably incorporated into the inks or dispersions in an amount between 0.01 wt % and 15 wt %, such as between 0.01 and 10 wt % or 0.1 wt % and 8 wt %, or between 0.1 and 6 wt %. The alkylnaphthalene sulfonate anionic surfactant is more preferably incorporated into the inks or dispersions in amounts between 0.2 wt % and 6 wt %, such as between 0.2% and 5 wt % and even more preferably between 1 wt % and 3 wt %.

In the inks of the invention, the alkylnaphthalene sulfonate anionic surfactant may be incorporated into the inks in an amount of up to 10 wt %, such as up to 8 wt %, up to 6 wt %, up to 4 wt %, or up to 2 wt %. In the inks of the invention, the alkylnaphthalene sulfonate anionic surfactant is preferably incorporated into the inks in an amount between 0.01 wt % and 10 wt %, such as between 0.01 and 8 wt % or 0.1 wt % and 6 wt %, or between 0.1 and 4 wt %. The alkylnaphthalene sulfonate anionic surfactant is more preferably incorporated into the inks in amounts between 0.2 wt % and 4 wt %, such as between 0.2% and 2 wt % and even more preferably between 0.3 wt % and 1 wt %.

Additives

The ink compositions of the invention may be inkjet ink compositions. The ink compositions of the invention may optionally comprise one or more additives that are compatible with the other components of the composition. Additives can be included in the ink composition of the invention to impart any number of desired properties, for example stability, smear resistance, viscosity, surface tension, coating penetration, optical density, color depth, adhesion, highlighter resistance, resolubility and crust resistance, among others.

Suitable additives for such uses and the amounts of such additives used are known and conventionally used in the art. Examples of additives for use in the inks and dispersions of the invention include, but are not limited to, defoamers, preservatives, surfactants, pH modifiers, viscosity modifiers, humectants, penetrating agents, and additional polymers, among others.

Defoamers

Defoamers may be included in the ink compositions of the invention to inhibit the formation of foam. Examples of suitable defoamers include, but are not limited to, silicone-based or non-silicone defoamers. Commercially available defoamers include, but are not limited to, Dow Coming® 71 and Dow Coming® 74 (from Dow Corning), TegoAirex® 901W, 902W, 904W from Evonik Industries/Tega, Tergitol® L-61, L-62, L-64 and L-101 (from Dow Chemical) and BYK-LP D 23651 (Altana). Defoamers may be included in the ink or dispersion compositions of the invention in amounts of between 0.1 to 3% by weight.

Preservatives

Preservatives, such as biocides and fungicides, may also be included in the ink compositions of the invention to inhibit the growth of microorganisms. Examples of suitable preservatives include, but are not limited to, sodium benzoate, pentachlorophenol sodium, 2-pyridinethiol-1-oxide sodium, sodium sorbate, sodium dehydroacetate, benziso-thiazolinone, 1,2-dibenzothiazolin-3-one, 1-(3-chlorallyl)-3, 5,7-triaza- 1 azoniaadamantane chloride (CTAC), methyl-isothiazolinone, and chloromethylisothiazolinone, among others. Commercially available biocides include UCAR-CIDE® 250 (available from Union Carbide Company), Proxel® CRL, Proxel® BDN, Proxel® GXL, Proxel®XL-2, Proxel® TN (available from Arch Chemicals, Smyrna, Ga.), Dowicil® (Dow Chemical, Midland, Mich.), Nuosept® (Huls America, Inc., Piscataway, N.J.), Omidines® (Olin Corp., Cheshire, Conn.), Nopcocides® (Henkel Corp., Ambler, Pa.), Troysans®, Ebotec MB (Troy Chemical Corp., Newark, N.J.), and XBINX® (PMC Specialties Group, Inc., Cincinnati, Ohio). The preservatives may be used alone or in combination. A preservative may be included in the ink or dispersion composition of the invention is an amount between 0.1 to 1.5% by weight.

Surfactants

Surfactants may be included in the ink or dispersion composition of the invention to reduce surface tension of the ink or dispersion composition. The surfactant can be an anionic surfactant, non-ionic surfactant or cationic surfactant. Suitable surfactants can include, but are not limited to, those listed below and in U.S. Pat. Nos. 5,116,409, 5,861, 447 and 6,849,111. Exemplary surfactants are commercially available under various trade names, such as the PLURONIC® series (BASF Corporation, Parsippany, N.J.), TETRONIC® series (BASF Corporation, Parsippany, N.J.), ARQUAD® series (Akzo Chemical Inc., Chicago, Ill.), TRITON® series (Union Carbide Corp., Danbury, Conn.), SURFONIC® series (Texaco Chemical Company, Houston, Tex.), ETHOQUAD® series (Akzo Chemical Inc., Chicago, Ill.), ARMEEN® series (Akzo Chemical Inc., Chicago, Ill.), ICONOL® series (BASF Corporation, Parsippany, N.J.), SURFYNOL® series (Air Products and Chemicals, Inc. Allentown, Pa.), TEGO® series (Evonik), DYNOL® series (Evonik) and ETHOMEEN® series (Akzo Chemical Inc., Chicago, Ill.), among others. The surfactants can be used alone or in combination. A surfactant may be included in the ink or dispersion composition of the invention in an amount between 0.1 to 10% by weight.

pH Modifiers

One or more pH modifiers can be included in the inks or dispersion of the invention to adjust or buffer the ink or dispersion composition to a desired pH. Examples of suitable pH modifiers include alkali hydroxides, alkali carbonates and bicarbonates, triethylamine, dimethylethanolamine, triethanolamine, mineral acids, hydrochloric acid, and sulfuric acid, among others. The pH modifiers can be used alone or in combination. A pH modifiers can be incorporated into the ink or dispersion composition in an amount between 0.1 to 2% by weight.

Viscosity Modifiers

The ink or dispersion composition of the invention may comprise one or more viscosity modifiers. Examples of suitable viscosity modifiers include, but are not limited to, resin compounds, alginic acid compounds, polyvinyl alcohol, hydroxypropyl cellulose, carboxymethyl cellulose, hydroxyethyl cellulose, methyl cellulose, salts of polyacrylic acid, polyvinyl pyrrolidone, gum arabic and starch, hydrophobic ethoxylated urethanes (HEURs), hydrophobically modified alkali swellable emulsions (HASEs), alkali swellable emulsions (ASEs), among others. The viscosity modifiers can be used alone or in combination. A viscosity modifier may be incorporated into the ink or dispersion composition in an amount between 0.5 to 10% by weight.

Penetrating Agents

Penetrating agents can be included in the ink of the invention to reduce bleeding of the ink composition when applied to a print substrate such as paper, among others. Examples of suitable penetrating agents include, but are not limited to, alkyl alcohols having 1 to 4 carbon atoms (e.g., ethanol), glycol ethers (e.g., ethylene glycol monomethyl ether), diols (e.g., 1,2-alkyl diols), formamide, acetamide, dimethylsulfoxide, sorbitol and sulfolane, among others. The penetrating agents may be used alone or in combination. A penetrating agents may be incorporated into the ink or dispersion composition of the invention in an amount between 1 to 20% by weight.

Additional Polymers

The ink composition of the invention can optionally include additional polymers (other than the three dispersants) to enhance drop formation and viscoelasticity in the inks, water fastness, rub and lightfastness of an ink image applied to and dried on a print substrate. Examples of such polymers include, but are not limited to, polyvinyl alcohols, polyesters, polyestermelamines, styrene/acrylic acid copolymers, styrene/maleic acid copolymers, styrene/maleic acid/alkyl acrylate copolymers, styrene/methacrylic acid copolymers, styrene/methacrylic acid/alkyl acrylate copolymers, styrene/maleic half ester copolymers, vinyl naphthalene/acrylic acid copolymers, vinyl naphthalene/maleic acid copolymers, and salts thereof, among others. Such additional polymers can be used alone or in combination. An additional polymer may be included in the ink composition of the invention in an amount between 0.1 to 20% by weight.

Self-Crosslinking Polymers

The ink composition of the invention may optionally comprise a self-crosslinking polymer to improve the durability of an ink image applied to and dried on a print substrate. Examples of such self-crosslinking polymers for use in the ink compositions include, but are not limited to, self-cross-linking acrylic polymers, styrene-acrylic copolymers, styrene-butadiene latexes, styrene-isoprene latexes, acrylonitrile-butadiene latexes, alkyd dispersions, vinyl polymers, silicone dispersions, polyamide dispersions, chlorinated olefin dispersions, and polyester dispersions, among other self-crosslinking polymers. Such self-crosslinking polymers can be used alone or in combination. A typical amount (by weight) of such self-crosslinking polymers that can be included in the composition of the invention is 0.1 to 20% by weight.

Other additives that can be included in the ink compositions of the invention include, but are not limited to anti-oxidants, ultraviolet absorbers, chelating agents, electric conductivity adjusters, oxygen absorbers, anti-kogation agents, anti-curling agents, and fragrances, among others. The amounts of such additives for use in aqueous inkjet ink compositions are known and conventionally used in the art.

Colorants

The ink and dispersions of the invention comprise an azo-functional colorant. Suitable colorants that can be used in the ink composition of the invention include organic dyes, pigments and lake dispersions. Colorants refer to a colorant particle that is typically water insoluble. Suitable dyes and pigments that can be used to form the ink compositions disclosed herein may include any azo organic dye or pigment known in the art, including, but not limited to, black, yellow, orange, brown, red, violet, blue, green, fluorescent, and polymer bond pigments. Azo-functional colorants include organic dyes & pigments containing at least one azo bond, examples of which include but are not limited to, azo pigments, phthalocyanine pigments, anthraquinone pigments, perylene and perynone pigments, polycyclic pigments, naphthol pigments, anthrapyrimidone pigments, quinacridone pigments, anthanthrone pigments, flavanthrone pigments, thioindigo pigments, dioxazine pigments, isoindoline and isoindolinone pigments, quinophthalone pigments, azine pigments, nitroso pigments, nitro pigments, triphenylmethane lake pigments, ovaine lake pigments, metal complex pigments, and natural pigments, among others. The pigment particles should be sufficiently small to permit free flow of the ink through the ejecting nozzle of an inkjet printing device.

Suitable azo colorants include, but are not limited to, for example, solvent dyes such as solvent red 8, 89, 119, 122, 127, 23, 24, .26, 164, 207; solvent yellow 2, 14, 33, 56, 72, 124, 62, 82, 90; solvent orange 2, 7, 54, 58, 62, 99; disperse dyes such as disperse orange 1, 5, 13, 25, 29, 30, 31, 44, 73, 76, disperse yellow 3, 7, 56, 114, 163, 211, disperse blue 79, 102, 106, 124, 148, 165, 183, 291, 301, 360, disperse red 1, 5, 13, 17, 50, 54, 65, 72, 73, 74, 82, 92, 97, 98, 153, 177, 179, supracet brilliant red BD, disperse black 1, 9, disperse violet 33, 63, disperse brown 1; organic pigments such as pigment yellow 12, 83, 151,154, 176, 180, 181, 183, 191, pigment orange 5, pigment red 2, 112.

Disperse azo-dyes for use in the invention include those with the following structures:

Disperse Orange 25

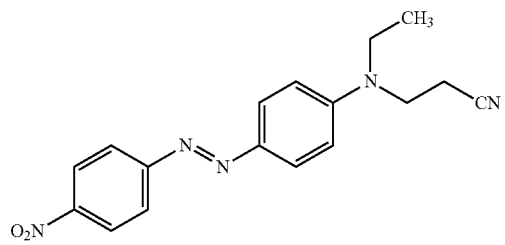

Dipserse Orange 30

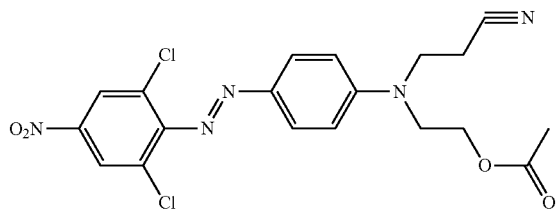

Disperse Brown 27

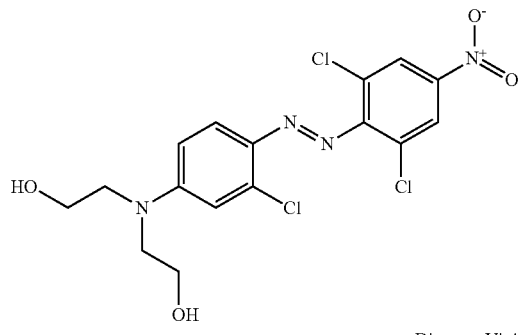

Disperse Violet 43

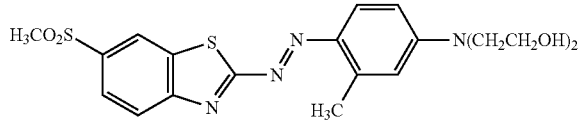

Amount of Colorant

The inks of the invention (for example in the form of an inkjet ink) may comprise at least 0.1, such as at least 0.5, at least 1, at least 1.5, and at least 2% by weight of the azo colorant. The inks of the invention may comprise the colorant in an amount of at most 10%, such as at most 9%, at most 8%, at most 7%, at most 6%, or at most 5% by weight. The amount of the colorant present in the ink compositions of the invention may be between 0.1 and 25% by weight, such as between 0.1 and 15 wt %, and preferably between 0.1 and 10% by weight, or more preferable between 2 wt % and 13 wt %, such as between 2 and 5% by weight.

A colorant used in the inventive inkjet ink compositions can comprise one or more embodiments described herein.

Fluid Carrier

The ink compositions (e.g., an inkjet ink) may comprise a fluid carrier. The fluid carrier may be water. The fluid carrier may comprise a mixture of water and one or more organic co-solvents, which can be water-soluble organic co-solvents, water-miscible organic co-solvents, or a combination thereof. The organic co-solvents can be added either alone or in combination.

The organic co-solvents may be humectants, which reduce the rate of evaporation of the water component and prevent the ink composition from drying out or crusting in the nozzles of the printhead, minimizing clogging of the nozzles. The organic co-solvents can enhance the solubility of the components in the ink composition of the invention (e.g. inkjet inks) and facilitate penetration of a printed ink composition into a substrate.

Suitable water-soluble and water-miscible organic co-solvents include, but are not limited to, alcohols (e.g., methanol, ethanol, propanol, isopropyl alcohol, butanol, polyols, ethylene glycol, glycerine, and PEG, among others), ketones and ketone alcohols (e.g., acetone and diacetone alcohol, among others), ethers (e.g., tetrahydrofuran, dioxane, and alkylethers, among others), ethers of polyhydric alcohols (e.g., ethylene glycol monomethyl ether, ethylene glycol monoethyl ether, ethylene glycol monoethyl ether acetate, di(ethyleneglycol) monomethyl ether), nitrogen-containing solvents (e.g., 2-pyrrolidone, and N-methyl-2-pyrrolidone, among others), sulfur-containing solvents (e.g., 2,2'-thiodiethanol, dimethylsulfoxide, tetramethylene sulfone, and sulfolane, among others), and sugars and derivatives thereof (e.g., glucose, oxyethylene adducts of glycerin, and oxyethylene adducts of diglycerin, among others).

Amount of Fluid Carrier

Water may be present in the ink compositions of the invention (e.g. inkjet inks) in an amount of at least 5, at least 8, at least 10, at least 15, at least 20, at least 25, and at least 30% by weight. Water may be present in the ink compositions of the invention (e.g. inkjet inks) in an amount of at most 95, at most 85, at most 80, at most 75, at most 70, at most 65, and at most 60% by weight. Water may be present in the ink compositions of the invention (e.g. inkjet inks) in an amount between 5 to 95% by weight, such as 10 to 80, and preferably 20 to 70% by weight. Water may more preferably be incorporated into the ink compositions of the invention in an amount between 15 and 75% by weight, and even more preferably between 30 and 60% by weight, such as between 30 and 50 wt %.

The organic cosolvent may be incorporated into the ink composition of the invention in an amount of at most 80, such as at most 70, at most 60, and at most 50% by weight. The organic co-solvent may be incorporated into the ink composition of the invention (e.g., an inkjet ink composition) in an amount of at least 1, such as at least 5, and at least 10% by weight. The organic co-solvent may be incorporated into the inks or dispersions of the invention in an amount of between 1 and 80% by weight, or 10 wt % and 90 wt %, and preferably between 30 wt % and 80 wt %. or between 10 to 50% by weight, or between 20 and 24 wt %.

An organic co-solvent used in the inventive ink compositions can comprise one or more embodiments described herein.

Co-Solvent

In addition to an organic cosolvent of the fluid carrier component, which can itself function as a humectant, one or more additional humectants can be included in the ink compositions of the invention (e.g. an inkjet ink) to reduce the rate of evaporation of the water component and prevent the ink composition drying out in the nozzles of the printhead, which can occur during periods of latency. Including a humectant can minimize clogging of the nozzles. Humectants can be selected from materials having high hygroscopicity and water-solubility. Examples of suitable humectants include, but are not limited to, polyols (e.g., glycerol, ethylene glycol), alcohol ethers (e.g., diethylene glycol, triethylene glycol), lactams (e.g., 2-pyrrolidone, urea compounds such as urea, 1,3-dimethylimidazolidinone), saccharides (e.g., sorbitol), 1,4-cyclohexanedimethanol, 1-methyl-2-piperidone, N-ethylacetamide, 3-amino-1,2-propanediol, ethylene carbonate; butyrolacetone and Liponic EG-1, among others. There are no particular limitations on the amount used of the humectant. A humectant may be incorporated into the ink and dispersion compositions of the invention in an amount between 0.5 to 30% by weight.

Substrates

The invention further provides a decorated substrate formed from deposition of an ink of the invention onto a substrate. The ink of the invention may incorporate at least two non-ionic dispersants, wherein the first non-ionic dispersant has acid-functional groups for water solubility and the second non-ionic dispersant has water solubility from a glycol backbone with the addition of amine-rich functionality, as well as a third dispersant which is an alkylnaphthalene sulfonate anionic surfactant with the alkyl being hydrogen, methyl, or ethyl.

The substrate can be printed with at least one or more inks of the invention and then cured by either a serial arrangement of near Infrared (NIR) lamps or thermally cured using a thermal heating device.

Suitable substrate materials for use with the invention include any typical substrate material, including paper, plastic, metal and/or composite. The substrate for use in the invention may be a plastic film based on, for example, polyethylene, polypropylene, biaxially oriented polypropylene, cast polypropylene, polyethylene terephthalate (PET), biaxially oriented PET, polyamide, polystyrene, and bio-based films and foils derived from polylactic acid, as used for packaging material and food-packaging material.

Advantageously, the inks of the invention do not require a chemical primer layer or chemical pre-treatment on the substrate in order to achieve good adherence. Nonetheless, the substrate for use in the invention may be coated, for example, by an acrylic coating or a polyurethane coating, or may be chemically surface treated, corona surface treated, plasma surface treated, flame-treated metallized, or neat (i.e. uncoated/untreated).

Preparation of the Dispersion Compositions

The present invention further provides a method of preparing the dispersion compositions disclosed herein. The dispersion compositions of the invention can be prepared by pre-mixing a colorant (dye or pigment) in water with the three dispersant materials, and then subjecting to milling process until the required particle size is obtained. The dispersion can then be filtered.

Preparation of the Inkjet Ink Compositions

The present invention further provides a method for preparing the printing ink of the invention. The method comprises the steps of:
1. Preparing a colorant dispersion by mixing an azo-functional colorant together with at least two different functionality non-ionic dispersants, a third dispersant which is and an alkylnaphthalene sulfonate anionic surfactant with the alkyl being hydrogen, methyl, or ethyl; an organic solvent and optionally an additional surfactant and biocide.
2. Milling the slurry until the required particle size is obtained; the individual dye, pigment or colorant dispersions can be subjected to milling to provide a pigment or colorant dispersion which is stable, and the pigment particles have preferred average particle size of between 100 nm and 250 nm, as determined by ISO 13320:2009.
3. Adding water, an organic solvent and optionally additional other chemical agents to said dispersions, thereby obtaining water-based inks.

The method of the invention may comprise the steps of:
1. Preparing a dye or pigment dispersion by mixing a dye or pigment together with at least the non-ionic dispersant having acid-functional groups for water solubility and a second dispersant having water solubility from a glycol backbone with the addition of amine-rich functionality, a third dispersant which is ionic in nature, preferably anionic, as the dispersants; an organic solvent and optionally an additional surfactant and biocide.
2. Milling the slurry until the required particle size is obtained; the individual dye, pigment or colorant dispersions can be subjected to milling to provide a pigment or colorant dispersion which is stable, and the pigment particles have preferred average particle size of between 100 nm and 250 nm, as determined by ISO 13320:2009.
3. Adding water, an organic solvent and optionally additional other chemical agents to said dispersions, thereby obtaining water-based inks.

The invention also provides methods of preparing the inkjet ink compositions disclosed herein. In some embodiments, the inkjet ink compositions of the invention can be prepared by mixing a dispersion of a dye or pigment in water and the three dispersants with at least an organic solvent, surfactant and a biocide.

In another embodiment, the inkjet ink composition can be prepared by mixing a pigment in water and the three dispersants with at least an organic solvent, fluid carrier, an optional crosslinking agent, and optional additives.

In another embodiment, the fluid carrier can be prepared by combining one or more water-soluble organic co-solvents, one or more water-miscible organic co-solvents or a mixture thereof, with water, which can be combined with the other components of the composition. In one embodiment, the organic co-solvent(s) and water of the fluid carrier can be combined directly with the water-dispersible polymer, colorant(s), optional crosslinking agent and optional additives.

An ink composition according to the invention can comprise a combination of two or more embodiments described herein.

The water-based inks are prepared in the normal manner. A dispersion of the pigment can be prepared in the traditional manner using high shear mixing to form a concentrate pre-mix and then milling. Normally, the carrier liquid, which can be water or another solvent liquid, is mixed under high shear conditions with a dispersing agent and a wetting agent whilst a powder of the pigment is added. The resulting mixture is typically mixed under high shear conditions for a short time before charging to a bead mill, for example a Netzsch or Buhler mill. The suspension is milled for a fixed time until the desired particle size of the dispersion is reached—typically 100-150 nm. At this time, the dispersion is usually discharged from the mill through a filter cartridge into a holding or storage vessel. The dispersions can be made separately, or the two pigments can be combined as powders at the start and essentially co-processed together through the high shear mixing and milling phases.

The ink is prepared in the normal manner for an aqueous pigment ink. To the stirred liquid comprising water, or another suitable solvent, is added the co-solvents. The colorant dispersion(s) are then added slowly, and the other components of the ink are then added—this may be components such as biocides or preservatives, binders, polymers, resins, surfactants, wetting agents and small quantities of other co-solvents. The ink is pumped under positive pressure through a cartridge filter and packed.

Methods of Printing

The present invention also provides a method for the decoration of textiles or other industrial substrates such as for example plastics, paper, thermal sublimation transfer paper, cardboard, leather, fibreboard, wallpaper or wood (etc.) by contacting a substrate with a water-based ink according to the invention and subsequently fixing the said water-based ink onto said substrate using NIR radiation, heat treatment or sublimation paper heat transfer.

The present invention also provides a method for printing a variety of different substrates, comprising the steps of:
1. Applying a water-based ink according to the previous aspect of the invention onto the substrate; and
2. Fixation of said water-based ink onto said substrate using NIR-radiation or thermal curing or directed air drying or steaming or a heat press.

The invention further includes methods of printing an image on a substrate by applying an inkjet ink composition according to the invention onto the substrate. In some embodiments, the inkjet ink compositions disclosed herein are adapted for use with an inkjet printing apparatus.

The invention also provides a method of printing an image, wherein droplets of an inkjet ink composition of the invention are ejected from a small nozzle of a printhead and deposited onto a print substrate to generate an image thereon. Suitable inkjet ink printing apparatus can include, but are not limited to, Drop-on-Demand Valve (DoD Valve), MEMS technology and Drop-on-Demand PiezoElectric (DoD Piezo).

Examples of suitable print substrates include, but are not limited to, textile materials, sublimation transfer papers, woods, bamboo, leather, wallpapers, fiberboards and cardboard, among others.

The inkjet ink dispersions and ink compositions of the invention may be formulated to have properties that allow for at least one of the following: 1) superior stability and shelf-life storage stability compared with inks prepared from other methods and using less than the three required classes of dispersants in this invention; 2) uniform, bleed-free print images with high resolution and high density on a print substrate; 3) inhibition or prevention of nozzle clogging which typically occurs due to drying of the ink at a distal end of a nozzle of the printing apparatus; 4) rapid drying on a print substrate (paper, fabric, film, etc.); 5) long-term storage stability; and 6) print characteristics that are independent of the print substrate quality. The inkjet ink compositions can also provide ink stability and robustness against fluctuating temperature conditions which can occur during transport and storage, to eliminate or inhibit nozzle clogging, banding, and poor print quality.

The inkjet ink compositions of the invention can be adapted specifically for use in textile articles and textile printing processes. The inkjet ink compositions of the invention can be adapted for textile printing and formulated to have at least one of the following properties: 1) fastness to textiles such as cotton, wool, hemp, linen, ramie, sisal, rayon, cellulose acetate, bamboo, flax, woven MET-PET (Metalized Orientated Polypropylene), PA (polyamide, Nylon), PET (Polyethylene Terephthalate), MET-PET (Metallized Polyethylene Terephthalate), PP (polypropylene) and PVC (Polyvinyl Chloride) or blends of the same; and 2) ease of application and fixation to the textile substrate.

The ink of the invention is suitable for use in an industrial high-speed digital printing press for the decoration of textiles and other substrates (for example, wallpapers). On printing the films, typically with the combination of black ink and standard inks of other colours comprising at least Cyan, Magenta and Yellow, and may also include, but not limited to spot colours such as Red, Orange, Violet and Green, the sequence of printing by digital means the separate colours and drying the resulting deposited wet inks by Near Infra-Red lamps at full power, enables the printing press to run at full speed and results in minimal deformation of the printed films. The end result is a very high productivity and a very high final print quality.

Improved Shelf-Life

Regarding shelf-life of both the dispersion and the resulting inks derived from the dispersions, normally, when using a common single dispersant alone, such as Altana BYK series of dispersants (for example, Disperbyk-190), the resulting dispersions have a short shelf-life of less than 3 months before there is irreversible sedimentation and an increase or decrease of other physical parameters measured of greater than 10%. This change cannot be tolerated and the same is seen in the inks containing a single dispersant where the shelf-life is a maximum of six months before the same irreversible increase of more than 10% of the measured physical parameters is evident. In the case of this invention, the use three synergistic dispersants promotes significantly longer shelf-life of 6-9 months for the dispersions and at least 12 months for the inks. This means inks can be made in advance and stored at ambient temperature and shipped when required without any quality concerns.

A further advantage is that the inks of the invention exhibit a brighter developed colour when printed either alone as a single colour ink or in combination with other inks containing one of these ultra-stable dispersions as a part thereof.

The invention is further described by the following numbered paragraphs:

1. A printing ink or pigment dispersion composition comprising a water-insoluble azo-functional colorant; at least two different functionality non-ionic dispersants; and an alkylnaphthalene sulfonate anionic surfactant with the alkyl being hydrogen, methyl or ethyl.

2. The composition of paragraph 1, further comprising organic co-solvent, a rheology-modifying polymer, water, surfactant and a pH adjustment agent.

3. The composition of paragraph 1 or 2, wherein the composition is an ink jet ink suitable for deposition through at least a single nozzle.

4. The composition of any preceding paragraph, wherein the water-insoluble azo-functional colorant is a disperse dye, a sublimation dye or a solvent dye.

5. The composition of any preceding paragraph, wherein the wherein the colorant is a disperse dye selected from the group consisting of Disperse Orange 25, Disperse Orange 30, Disperse Brown 27, Disperse Violet 43, or any other disperse dye containing at least one azo-linkage and combinations thereof.

6. The composition of any preceding paragraph, wherein at least one of the two different functionality non-ionic dispersants is a non-ionic polymer with water-solubilising polar groups.

7. The composition of paragraph 6, wherein the water-solubilising groups are selected from the group consisting of carboxylic acid or carboxylic acid salts, sulfonic acid, sulfonic acid salts and combinations thereof.

8. The composition of any preceding paragraph, wherein at least one of the two different functionality non-ionic dispersants is a non-ionic polymer containing glycol repeating units and amine-rich repeating units.

9. The composition of paragraph 8, wherein the glycol repeating units are ethyleneglycol, propyleneglycol or isopropyleneglycol.

10. The composition of any preceding paragraph, wherein the ionic dispersant is an alkylnaphthalenesulfonic acid or alkylnaphthalenesulfonate salt.

11. The composition of any preceding paragraph, comprising colorant particles which are at least Dv50 100-500 nm in diameter, more preferably 100-350 nm and even more preferably 100-250 nm.

12. The composition of any preceding paragraph, comprising 0.1-25.0 wt % of a water-insoluble azo-functional colorant, 0.1-10.0 wt % of a first non-ionic dispersant, 0.1-10 wt % of a second non-ionic dispersant and 0.1-10 wt % of an ionic dispersant; 0.1-30 wt % of an organic co-solvent; 0.01-5.0 wt % of an anti-foam agent; 0.001-0.5 wt % of a biocide and the remainder of the formulation is de-ionised water.

13. The composition of any preceding paragraph, wherein the dispersion of a water-insoluble azo-functional colorant is prepared initially using the two different functionality non-ionic dispersants and the ionic dispersant.

14. The composition of any preceding paragraph, wherein the composition is an ink with a pH of 7.0-10.5, more preferably 7.5-9.0 and even more preferably 7.9-8.7.

15. The composition of any preceding paragraph, having a static surface tension of <40 dyne/cm, more preferably <36 dyne/cm and even more preferably <35 dyne/cm.

16. The composition of any preceding paragraph, further comprising include at least one additional polymer.

17. The composition of paragraph 17, wherein the at least one additional polymer is selected from the group consisting of polyvinyl alcohols, polyesters, polyestermelamines, styrene/acrylic acid copolymers, styrene/maleic acid copolymers, styrene/maleic acid/alkyl acrylate copolymers, styrene/methacrylic acid copolymers, styrene/methacrylic acid/alkyl acrylate copolymers, styrene/maleic half ester copolymers, vinyl naphthalene/acrylic acid copolymers, vinyl naphthalene/maleic acid copolymers, and salts thereof, and blends thereof.

18. The composition of paragraph 2, wherein the surfactant is selected from the group consisting of anionic, cationic, neutral and combinations thereof.

19. The composition of any preceding paragraph, further comprising one or more additives selected from the group consisting of anti-foam agents, humectants and biocides.

20. A method for printing, comprising applying any one or more of the inks of paragraph 1-18 onto a substrate and curing.

21. The method of paragraph 19, wherein the method of printing is inkjet.

22. The method of any one or more of the paragraphs 19-20, wherein the substrate is selected from the group consisting of cotton, rayon, silk, polyester, PET (Polyethylene terephthalate), viscose, nylon, polyamide, canvas, cashmere, chenille, chiffon, crepe, damask, georgette, gingham, jersey, lace, linen, polyvinyl chloride, leather, merino wool, modal, muslin, organza, wood, satin, spandex, suede, caffeta, toile, tweed, twill, velvet and wallpaper.

23. The method of any or more of paragraphs 19-21, wherein the substrates do not contain a chemical primer or chemical pre-treatment layer.

24. The method of any or more of paragraphs 19-21, wherein the substrates contain a chemical primer or chemical pre-treatment layer.

25. The method of any or more of paragraphs 19-21, wherein the ink is printed onto a transfer paper.

26. The method of any or more of paragraphs 19-21, wherein the ink is printed directly onto a textile fabric.

27. The method of any or more of paragraphs 19-25, wherein the printing ink is subsequently overprinted with a topcoat.

28. The method of any or more of paragraphs 19-25, wherein the ink is cured using a near infrared (NIR) lamp or infrared lamp.

29. The method of any or more of paragraphs 19-25, wherein the ink is cured using a thermal method at between 30-250° C.

30. The method of any or more of paragraphs 19-25, wherein the ink is cured using an airflow method.

31. The method of any or more of paragraphs 19-29, comprising an inkjet printing head selected from the group consisting of thermal, drop-on-demand, continuous or MEMs.

32. A printed image comprising the composition of any one or more of paragraphs 1-18.

The present invention has been described in detail, including the preferred embodiments thereof. However, it will be appreciated that those skilled in the art, upon consideration of the present disclosure, may make modifications and/or improvements on this invention that fall within the scope and spirit of the invention.

EXAMPLES

The invention is further described by the following non-limiting examples which further illustrate the invention, and are not intended, nor should they be interpreted to, limit the scope of the invention.

Example 1a—Comparative Base Dispersion Formulation—Standard Non-Ionic Dispersant and Alkylnaphthalene Sulfonate. (2 Dispersants)

1a. Dispersion (Standard): To a mechanically stirred tank or vessel is added 34.66 g of deionised water (conductivity less than 25 microSiemens) and 7.24 g of Disperbyk 190 (Altana) (Standard non-ionic dispersant) and the two components mixed using stirring for a few minutes at ambient temperature. 5.05 g of a solution of 35.00 g of Morwet D425 (Nouryon) (Alkylnaphthalene sulfonate) in 65.00 g of deionised water is added and the mixture continued to be stirred at ambient temperature. Glycerine pharma grade (Brenntag) 6.74 g is then added, followed by Agitan 731 defoamer (0.13 g) and Ebotec MB biocide (0.07 g) are then added with continual stirring of the mixture. The pigment powder, Disperse Orange 25, 13.50 g, is then added slowly to the tank with continued stirring. The resulting mixture is stirred for 45 minutes and then mixed under high shear conditions for a further 60 minutes. The mixture is then pumped into an Retsch (Emax), and the process of milling is started. After 4 hours, the milling is deemed complete, and the dispersion is pumped back into a mechanically stirred tank and 32.60 g of deionised water is added. After mixing for a few minutes, the dispersion is pumped from the mill and stored. The physical properties of the dispersion were measured to give a particle size Z-average 94 nm, Dv50 75 nm and Dv95 154 nm (measured using a Malvern Zetasizer Nano-ZS). Base dispersion shows a non-ionic dispersant and an alkylnaphthalene sulfonate (where the alkyl group is not hydrogen, methyl or ethyl) can be used in a dispersion but exhibits instability.

Example 1b—Comparative Base Dispersion Formulation—Standard Non-Ionic Dispersant and Alkylnaphthalene Sulfonate (2 Dispersants) Using a Different Milling Method From Example 1a 1b. Dispersion (Standard): To a mechanically stirred tank or vessel is added 34.66 g of deionised water (conductivity less than 25 microSiemens), and 7.24 g of Disperbyk 190 (Altana) (Standard non-ionic dispersant) and the two components mixed using stirring for a few minutes at ambient temperature. 5.05 g of a solution of 35.00 g of Morwet D425 (Nouryon) (alkylnaphthalene sulfonate wherein the alkyl is not H, Me, or Et) in 65.00 g of deionised water is added and the mixture continued to be stirred at ambient temperature. Glycerine pharma grade (Brenntag) 6.74 g is then added, followed by Agitan 731 defoamer (0.13 g) and Ebotec MB biocide (0.07 g) are then added with continual stirring of the mixture. The pigment powder, Disperse Orange 25, 13.50 g is then added slowly to the tank with continued stirring. The resulting mixture is stirred for 45 minutes and then mixed under high shear conditions for a further 60 minutes. The mixture is then pumped into an Attritor (Netsch), and the process of milling is started. After 2 hours, the milling is deemed complete, and the dispersion is pumped back into a mechanically stirred tank and 32.60 g of deionised water is added. After mixing for a few minutes, the dispersion is pumped from the mill and stored. The physical properties of the dispersion were measured to give a particle size Z-average 196 nm, and Dv90 374 nm (measured using a Malvern Zetasizer Nano-ZS). Base dispersion shows a non-ionic dispersant and an alkylnaphthalene sulfonate (where the alkyl group is not hydrogen, methyl or ethyl) can be used in a dispersion but exhibits instability.

Example 1c—Comparative Base Dispersion Formulation—Standard Non-Ionic Dispersant and Alkylnaphthalene Sulfonate Using a Different Milling Method From Examples 1a, 1b 1c. Dispersion (Standard): To a mechanically stirred tank or vessel is added 34.66 kg of deionised water (conductivity less than 25 microSiemens), and 7.24 kg of Disperbyk 190 (Altana) (Standard non-ionic dispersant) and the two components mixed using stirring for a few minutes at ambient temperature. 5.05 kg of a solution of 35.00 kg of Morwet D425 (Nouryon) (Alkylnaphthalene sulfonate wherein the alkyl is not H or Me) in 65.00 kg of deionised water is added and the mixture continued to be stirred at ambient temperature. Glycerine pharma grade (Brenntag) 6.74 kg is then added, followed by Agitan 731 defoamer (0.13 kg) and Ebotec MB biocide (0.07 kg) are then added with continual stirring of the mixture. The pigment powder, Disperse Orange 25, 13.50 kg is then added slowly to the tank with continued stirring. The resulting mixture is stirred for 45 minutes and then mixed under high shear conditions for a further 60 minutes. The mixture is then pumped into an MMP3 (Buhler), and the process of milling is started. After 4 hours, the milling is deemed complete, and the dispersion is pumped back into a mechanically stirred tank and 32.60 kg of deionised water is added. After mixing for a few minutes, is pumped from the mill and stored. The physical properties of the dispersion were measured to give a viscosity of 3.1 cP (measured at 25° C. using a Brookfield 1); pH 5.78 (measured at 25° C. using a WTW pH-Electrode Sen Tix 81); conductivity 3.97 mScm-1 (measured at 25° C. WTW Tetra-Con 325); particle size Z-average 116 nm, Dv90 167 nm (measured using a Malvern Zetasizer Nano-ZS); pigment solids content 15.5% w/w (measured using a Shimadzu UV-Vis recording Spectrophotometer—UV-2501 PC). Base dispersion shows a non-ionic dispersant and an alkylnaphthalene sulfonate (where the alkyl group is not hydrogen, methyl or ethyl) can be used in a dispersion but exhibits instability.

Example 1d—Comparative Base Ink Formulation—Standard Non-Ionic Dispersant and Alkylnaphthalene Sulfonate 1d. Ink (Standard): To a mechanically stirred tank or vessel using a saw tooth impeller is added 34.00 g of dispersion; 13.87 g of deionised water (conductivity less than 25 microSiemens); 14.50 g of glycerine pharma grade (Brenntag); 26.0 g of monopropylene glycol; 0.2 g of triethanolamine 99%; 2.00 g of solution of 33.00 g of Joncryl EC0675 and 19.50 g of TEA 99% and 0.20 g of Agitan 731 and 0.09 g of Preventol D7 in 47.21 g of deionised water; 9.00 g of Tego Disperse 750 W; 0.3 g of Dynol 607; 0.03 g of Preventol D7; 0.1 g of Ebotec MB. The mixture is stirred for a 45 mins following complete addition of the liquids and then pumped through a cascade 1-micron polypropylene (absolute) depth filter+1-micron glass fiber (absolute) filter+0.6-micron polypropylene (absolute) filter to afford the finished ink. The physical properties of the ink were measured to give a viscosity of 12.00 cP (measured at 23° C. at low shear using a ThermoHaake Rheostress 1); pH 8.00 (measured at 25° C. using a WTW pH-Electrode SenTix 81); conductivity 1.000mScm-1 (measured at 25° C. using a WTW Tetra-Con 325); Static surface tension (measured using SITA tensiometer with O-ring): 33.40 mNm-1; particle size Z-average 126 nm, Dv50 101 nm, Dv95 278 nm (measured using a Malvern Zetasizer Nano-ZS). Base ink shows a non-ionic dispersant and an alkylnaphthalene sulfonate (where the alkyl group is not hydrogen, methyl or ethyl) can be used in an ink but exhibits some instability and can be improved upon.

Example 2a—Comparative Base Dispersion Formulation Amine Functional Dispersant (AF) Plus Alkyl Naphthalene Sulfonate (ANS)

2a. Dispersion: To a mechanically stirred tank or vessel is added 34.66 g of deionised water (conductivity less than 25 microSiemens), and 7.24 g of Bykjet 9171 (Altana) (Non-ionic block co-polymer with aminic pigment affinic groups) and the two components mixed using stirring for a few minutes at ambient temperature. 5.05 g of a solution of 35.00 g of Morwet D425 (Nouryon) (Alkylnaphthalene sulfonate where the alkyl group is not hydrogen, methyl or ethyl) in 65.00 g of deionised water is added and the mixture continued to be stirred at ambient temperature. Glycerine pharma grade (Brenntag) 6.74 g is then added, followed by Agitan 731 defoamer (0.13 g) and Ebotec MB biocide (0.07 g) are then added with continual stirring of the mixture. The pigment powder, Disperse Orange 25, 13.50 g is then added slowly to the tank with continued stirring. The resulting mixture is stirred for 45 minutes and then mixed under high shear conditions for a further 60 minutes. The mixture is then pumped into an Retsch or Attritor bead mill (Netzsch) and the process of milling is started. After 4 hours, the milling is deemed complete, and the dispersion is pumped back into a mechanically stirred tank and 32.60 g of deionised water is added. After mixing for a few minutes, the dispersion is pumped from the mill and stored. The physical properties of the dispersion were measured to give a particle size Z-average 78 nm, Dv50 63 nm, Dv95 148 nm (measured using a Malvern Zetasizer Nano-ZS). Demonstrates a small improvement for stability over the examples 1a-1c.

Example 3a—Comparative Base Dispersion Formulation Amine Functional Dispersant (AF) Plus Alkyl Naphthalene Sulfonate (ANS)

3a. Dispersion (Amine-rich dispersant plus alkylnaphtha-lenesulfonate): To a mechanically stirred tank or vessel is added 34.66 g of deionised water (conductivity less than 25 microSiemens), and 7.24 g of Bykjet 9171 (Altana) (Non-ionic block co-polymer with aminic pigment affinic groups) and the two components mixed using stirring for a few minutes at ambient temperature. 5.05 g of a solution of 35.00 g of Oparyl DT505 (Bozzetto) (methylnaphthalene sulfonate) in 65.00 g of deionised water is added and the mixture continued to be stirred at ambient temperature. Glycerine pharma grade (Brenntag) 6.74 g is then added, followed by Agitan 731 defoamer (0.13 g) and Ebotec MB biocide (0.07 g) are then added with continual stirring of the mixture. The pigment powder, Disperse Orange 25, 13.50 g is then added slowly to the tank with continued stirring. The resulting mixture is stirred for 45 minutes and then mixed under high shear conditions for a further 60 minutes. The mixture is then pumped into an Retsch or Attritor bead mill and the process of milling is started. After 4 hours, the milling is deemed complete, and the dispersion is pumped back into a mechanically stirred tank and 32.60 g of deionised water is added. After mixing for a few minutes, the dispersion is pumped from the mill and stored. The physical properties of the dispersion were measured to give a particle size Z-average 85 nm, Dv50 68 nm, Dv95 169 nm (measured using a Malvern Zetasizer Nano-ZS). Demonstrates a small improvement for stability over the examples 1a-1c.

Example 4a—Comparative Base Dispersion Formulation Amine Functional Dispersant (AF) Plus Alkyl Naphthalene Sulfonate (ANS)

4a. Dispersion: To a mechanically stirred tank or vessel is added 34.66 g of deionised water (conductivity less than 25 microSiemens), and 7.24 g of Bykjet 9171 (Altana) (Non-ionic block co-polymer with aminic pigment affinic groups) and the two components mixed using stirring for a few minutes at ambient temperature. 5.05 g of a solution of 35.00 g of Surfaron A1530N100 (Synthron) (Methylnaphthalene sulfonate, sodium salt) in 65.00 g of deionised water is added and the mixture continued to be stirred at ambient temperature. Glycerine pharma grade (Brenntag) 6.74 g is then added, followed by Agitan 731 defoamer (0.13 g) and Ebotec MB biocide (0.07 g) are then added with continual stirring of the mixture. The pigment powder, Disperse Orange 25, 13.50 g is then added slowly to the tank with continued stirring. The resulting mixture is stirred for 45 minutes and then mixed under high shear conditions for a further 60 minutes. The mixture is then pumped into an Retsch or Attritor bead mill and the process of milling is started. After 4 hours, the milling is deemed complete, and the dispersion is pumped back into a mechanically stirred tank and 32.60 g of deionised water is added. After mixing for a few minutes, the dispersion is pumped from the mill and stored. The physical properties of the dispersion were measured to give a particle size Z-average 107 nm, Dv50 87 nm, Dv95 224 nm (measured using a Malvern Zetasizer Nano-ZS). Demonstrates poorer stability compared to examples 1a-1c.

Example 5a—Comparative Base Dispersion Formulation Non-Ionic Dispersant (NI) Plus Alkylnaphthalene Sulfonate (ANS)

5a. Dispersion: To a mechanically stirred tank or vessel is added 34.66 g of deionised water (conductivity less than 25 microSiemens), and 7.24 g of SYNTHRO®-PON W599 (Synthron) (Non-ionic dispersant) and the two components mixed using stirring for a few minutes at ambient temperature. 5.05 g of a solution of 35.00 g of Morwet D425 (Nouryon) (Alkylnaphthalene sulfonate where the alkyl group is not hydrogen, methyl or ethyl) in 65.00 g of deionised water is added and the mixture continued to be stirred at ambient temperature. Glycerine pharma grade (Brenntag) 6.74 g is then added, followed by Byk LPD23651 defoamer (0.13 g) and Ebotec MB biocide (0.07 g) are then added with continual stirring of the mixture. The pigment powder, Disperse Orange 25, 13.50 g is then added slowly to the tank with continued stirring. The resulting mixture is stirred for 45 minutes and then mixed under high shear conditions for a further 60 minutes. The mixture is then pumped into an Retsch mill and the process of milling is started. After 4 hours, the milling is deemed complete, and the dispersion is pumped back into a mechanically stirred tank and 32.60 g of deionised water is added. After mixing for a few minutes, the dispersion is pumped from the mill and stored. The physical properties of the dispersion were measured to give a particle size Z-average 143 nm, Dv50 129 nm, Dv95 322 nm (measured using a Malvern Zetasizer Nano-ZS). Showed a significant stability improvement over the base dispersions 1a-1c but would not filter.

Example 6a—Comparative Base Dispersion Formulation Non-Ionic Dispersant (NI) Plus Alkylnaphthalene Sulfonate (ANS)

6a. Dispersion: To a mechanically stirred tank or vessel is added 34.66 g of deionised water (conductivity less than 25 microSiemens), and 7.24 g of SYNTHRO®-PON W599 (Synthron) (Non-ionic dispersant) and the two components mixed using stirring for a few minutes at ambient temperature. 5.05 g of a solution of 35.00 g of Oparyl DT505 (Bozzetto) (methylnaphthalene sulfonate) in 65.00 g of deionised water is added and the mixture continued to be stirred at ambient temperature. Glycerine pharma grade (Brenntag) 6.74 g is then added, followed by Agitan 731 defoamer (0.13 g) and Ebotec MB biocide (0.07 g) are then added with continual stirring of the mixture. The pigment powder, Disperse Orange 25, 13.50 g is then added slowly to the tank with continued stirring. The resulting mixture is stirred for 45 minutes and then mixed under high shear conditions for a further 60 minutes. The mixture is then pumped into an Retsch or Attritor bead mill and the process of milling is started. After 4 hours, the milling is deemed complete, and the dispersion is pumped back into a mechanically stirred tank and 32.60 g of deionised water is added. After mixing for a few minutes, the dispersion is pumped from the mill and stored. The physical properties of the dispersion were measured to give a particle size Z-average 105 nm, Dv50 89 nm, Dv95 229 nm (measured using a Malvern Zetasizer Nano-ZS). Showed improved stability and filter time over the base dispersions 1a-1c. However, the particle size change after 28 days was significantly worse than the compositions of the invention.

Example 7a—Comparative Base Dispersion Formulation Sodium Lignosulfonate (SLS) Plus Non-Ionic Dispersant (NI)

7a. Dispersion: To a mechanically stirred tank or vessel is added 34.66 g of deionised water (conductivity less than 25 microSiemens), and 7.24 g of SYNTHRO®-PON W599 (Synthron) (Non-ionic dispersant) and the two components mixed using stirring for a few minutes at ambient temperature. 5.05 g of a solution of 40.00 g of Vanisperse CB (Borregaard) (Sodium Lignosulfonate dispersant) in 60.00 g of deionised water is added and the mixture continued to be stirred at ambient temperature. Glycerine pharma grade (Brenntag) 6.74 g is then added, followed by Agitan 731 defoamer (0.13 g) and Ebotec MB biocide (0.07 g) are then added with continual stirring of the mixture. The pigment powder, Disperse Orange 25, 13.50 g is then added slowly to the tank with continued stirring. The resulting mixture is stirred for 45 minutes and then mixed under high shear conditions for a further 60 minutes. The mixture is then pumped into an Retsch mill and the process of milling is started. After 4 hours, the milling is deemed complete, and the dispersion is pumped back into a mechanically stirred tank and 32.60 g of deionised water is added. After mixing for a few minutes, the dispersion is pumped from the mill and stored. The physical properties of the dispersion were measured to give a particle size Z-average 96 nm, Dv50 77 nm, Dv95 198 nm (measured using a Malvern Zetasizer Nano-ZS). Showed improved stability and filter time over the base dispersions 1a-1c. However, the particle size change after 28 days was significantly worse than the compositions of the invention.

Example 8a—Comparative Base Dispersion Formulation Non-Ionic Dispersant (NI) Plus Alkylnaphthalene Sulfonate (ANS)

8a. Dispersion: To a mechanically stirred tank or vessel is added 34.66 g of deionised water (conductivity less than 25microSiemens), and 7.24 g of Bykjet 9152 (Altana) (non-ionic dispersant) and the two components mixed using stirring for a few minutes at ambient temperature. 5.05 g of a solution of 35.00 g of Morwet D425 (Nouryon) (Alkylnaphthalene sulfonate where the alkyl group is not hydrogen, methyl or ethyl) in 65.00 g of deionised water is added and the mixture continued to be stirred at ambient temperature. Glycerine pharma grade (Brenntag) 6.74 g is then added, followed by Agitan 731 defoamer (0.13 g) and Ebotec MB biocide (0.07 g) are then added with continual stirring of the mixture. The pigment powder, Disperse Orange 25, 13.50 g is then added slowly to the tank with continued stirring. The resulting mixture is stirred for 45 minutes and then mixed under high shear conditions for a further 60 minutes. The mixture is then pumped into an Retsch or Attritor bead mill and the process of milling is started. After 4 hours, the milling is deemed complete, and the dispersion is pumped back into a mechanically stirred tank and 32.60 g of deionised water is added. After mixing for a few minutes, the dispersion is pumped from the mill and stored. The physical properties of the dispersion were measured to give a particle size Z-average 110 nm, Dv50 87 nm, Dv95 233 nm (measured using a Malvern Zetasizer Nano-ZS). Showed improved stability but much poorer filter time over the base dispersions 1a-1c.

Example 9a—Comparative Base Dispersion Formulation Non-Ionic Dispersant (NI) Plus Alkylnaphthalene Sulfonate (ANS)

9a. Dispersion: To a mechanically stirred tank or vessel is added 34.66 g of deionised water (conductivity less than 25 microSiemens), and 7.24 g of SYNTHRO®-PON W599 (Synthron) (Non-ionic dispersant) and the two components mixed using stirring for a few minutes at ambient temperature. 5.05 g of a solution of 35.00 g of Oparyl DT505 (Bozzetto) (methylalkylnaphthalene sulfonate) in 65.00 g of deionised water is added and the mixture continued to be stirred at ambient temperature. Glycerine pharma grade (Brenntag) 6.74 g is then added, followed by Agitan 731 defoamer (0.13 g) and Ebotec MB biocide (0.07 g) are then added with continual stirring of the mixture. The pigment powder, Disperse Orange 25, 13.50 g is then added slowly to the tank with continued stirring. The resulting mixture is stirred for 45 minutes and then mixed under high shear conditions for a further 60 minutes. The mixture is then pumped into an Retsch mill and the process of milling is started. After 4 hours, the milling is deemed complete, and the dispersion is pumped back into a mechanically stirred tank and 32.60 g of deionised water is added. After mixing for a few minutes, the dispersion is pumped from the mill and stored. The physical properties of the dispersion were measured to give a particle size Z-average 105 nm, Dv50 89 nm, Dv95 229 nm (measured using a Malvern Zetasizer Nano-ZS). Showed improved stability and filter time over the base dispersions 1a-1c. However, the particle size change after 28 days was significantly worse than the compositions of the invention.

Example 10a—Comparative Base Dispersion Formulation Non-Ionic Dispersant (NI) Plus Alkylnaphthalene Sulfonate (ANS)

10a. Dispersion: To a mechanically stirred tank or vessel is added 34.66 g of deionised water (conductivity less than 25 microSiemens), and 7.24 g of Disperbyk 190 (Altana) (Standard non-ionic dispersant) and the two components mixed using stirring for a few minutes at ambient temperature. 5.05 g of a solution of 35.00 g of Oparyl DT505 (Bozzetto) (methylnaphthalene sulfonate) in 65.00 g of deionised water is added and the mixture continued to be stirred at ambient temperature. Glycerine pharma grade (Brenntag) 6.74 g is then added, followed by Agitan 731 defoamer (0.13 g) and Ebotec MB biocide (0.07 g) are then added with continual stirring of the mixture. The pigment powder, Disperse Orange 25, 13.50 g is then added slowly to the tank with continued stirring. The resulting mixture is stirred for 45 minutes and then mixed under high shear conditions for a further 60 minutes. The mixture is then pumped into an Attritor bead mill, and the process of milling is started. After 2 hours, the milling is deemed complete, and the dispersion is pumped back into a mechanically stirred tank and 32.60 g of deionised water is added. After mixing for a few minutes, the dispersion is pumped from the mill and stored. The physical properties of the dispersion were measured to give a particle size Z-average 200 nm (measured using a Malvern Zetasizer Nano-ZS). Showed poorer particle size reduction during milling and target particle size not achieved.

Example 11a—Comparative Base Dispersion Formulation Non-Ionic Dispersant (NI) Plus Alkylnaphthalene Sulfonate (ANS)

11a. Dispersion: To a mechanically stirred tank or vessel is added 34.66 g of deionised water (conductivity less than 25 microSiemens), and 7.24 g of Edaplan 492 (Munzing Chemie) (Non-Ionic dispersant) and the two components mixed using stirring for a few minutes at ambient temperature. 5.05 g of a solution of 35.00 g of Oparyl DT505 (Bozzetto) (methylnaphthalene sulfonate) in 65.00 g of deionised water is added and the mixture continued to be stirred at ambient temperature. Glycerine pharma grade (Brenntag) 6.74 g is then added, followed by Agitan 731 defoamer (0.13 g) and Ebotec MB biocide (0.07 g) are then added with continual stirring of the mixture. The pigment powder, Disperse Orange 25, 13.50 g is then added slowly to the tank with continued stirring. The resulting mixture is stirred for 45 minutes and then mixed under high shear conditions for a further 60 minutes. The mixture is then pumped into an Attritor bead mill, and the process of milling is started. After 2 hours, the milling is deemed complete, and the dispersion is pumped back into a mechanically stirred tank and 32.60 g of deionised water is added. After mixing for a few minutes, the dispersion is pumped from the mill and stored. The physical properties of the dispersion were measured to give a particle size Z-average 239 nm (measured using a Malvern Zetasizer Nano-ZS). Showed poorer particle size reduction during milling and target particle size not achieved.

Example 12a—Comparative Base Dispersion Formulation Non-Ionic Dispersant (NI) Plus Alkylnaphthalene Sulfonate (ANS)

12a. Dispersion: To a mechanically stirred tank or vessel is added 34.66 g of deionised water (conductivity less than 25 microSiemens), and 7.24 g of Disperbyk 2010 (Altana) (Anionic dispersant) and the two components mixed using stirring for a few minutes at ambient temperature. 5.05 g of a solution of 35.00 g of Oparyl DT505 (Bozzetto) (alkylnaphthalene sulfonate) in 65.00 g of deionised water is added and the mixture continued to be stirred at ambient temperature. Glycerine pharma grade (Brenntag) 6.74 g is then added, followed by Agitan 731 defoamer (0.13 g) and Ebotec MB biocide (0.07 g) are then added with continual stirring of the mixture. The pigment powder, Disperse Orange 25, 13.50 kg is then added slowly to the tank with continued stirring. The resulting mixture is stirred for 45 minutes and then mixed under high shear conditions for a further 60 minutes. The mixture is then pumped into an Retsch or Attritor bead mill and the process of milling is started. After 4 hours, the milling is deemed complete, and the dispersion is pumped back into a mechanically stirred tank and 32.60 g of deionised water is added. After mixing for a few minutes, the dispersion is pumped from the mill and stored. The physical properties of the dispersion were measured to give a particle size Z-average 130 nm, Dv50 115 nm, Dv90 29 nm (measured using a Malvern Zetasizer Nano-ZS). Demonstrated a better stability but poorer filter time over the standard 1a-1c.

Example 13a—Comparative Base Dispersion Formulation Anionic Dispersant (AS) Plus Alkylnaphthalene Sulfonate (ANS)

13a. Dispersion: To a mechanically stirred tank or vessel is added 34.66 g of deionised water (conductivity less than 25 microSiemens), and 7.24 g of Tego Disperse 750 W (Slightly anionic dispersant) (Evonik) and the two components mixed using stirring for a few minutes at ambient temperature. 5.05 g of a solution of 35.00 g of Oparyl DT505 (Bozzetto) (methylnaphthalene sulfonate) in 65.00 g of deionised water is added and the mixture continued to be stirred at ambient temperature. Glycerine pharma grade (Brenntag) 6.74 g is then added, followed by Agitan 731 defoamer (0.13 g) and Ebotec MB biocide (0.07 g) are then added with continual stirring of the mixture. The pigment powder, Disperse Orange 25, 13.50 g is then added slowly to the tank with continued stirring. The resulting mixture is stirred for 45 minutes and then mixed under high shear conditions for a further 60 minutes. The mixture is then pumped into an Attritor bead mill, and the process of milling is started. After 2 hours, the milling is deemed complete, and the dispersion is pumped back into a mechanically stirred tank and 32.60 g of deionised water is added. After mixing for a few minutes, the dispersion is pumped from the mill and stored. The physical properties of the dispersion were measured to give a particle size Z-average 206 nm (measured using a Malvern Zetasizer Nano-ZS). Showed poorer particle size reduction during milling and target particle size not achieved.

Example 14a—Comparative Base Dispersion Formulation Non-Ionic Dispersant (NI) Plus Alkylnaphthalene Sulfonate (ANS)

14a. Dispersion: To a mechanically stirred tank or vessel is added 34.66 g of deionised water (conductivity less than 25 microSiemens), and 7.24 g of Bykjet 9152 (Altana) (Non-ionic block co-polymer with pigment affinic groups) and the two components mixed using stirring for a few minutes at ambient temperature. 5.05 g of a solution of 35.00 g of Oparyl DT505 (Bozzetto) (methylnaphthalene sulfonate) in 65.00 g of deionised water is added and the mixture continued to be stirred at ambient temperature. Glycerine pharma grade (Brenntag) 6.74 g is then added, followed by Agitan 731 defoamer (0.13 g) and Ebotec MB biocide (0.07 g) are then added with continual stirring of the mixture. The pigment powder, Disperse Orange 25, 13.50 g is then added slowly to the tank with continued stirring. The resulting mixture is stirred for 45 minutes and then mixed under high shear conditions for a further 60 minutes. The mixture is then pumped into an Attritor bead mill, and the process of milling is started. After 2 hours, the milling is deemed complete, and the dispersion is pumped back into a mechanically stirred tank and 32.60 g of deionised water is added. After mixing for a few minutes, the dispersion is pumped from the mill and stored. The physical properties of the dispersion were measured to give a particle size Z-average 257 nm (measured using a Malvern Zetasizer Nano-ZS). Showed poorer particle size reduction during milling and target particle size not achieved.

Example 15a—Inventive Non-Ionic Dispersant (NI) Plus Alkylnaphthalene Sulfonate (ANS) Plus Amine Functional Dispersant (AF)

15a. Dispersion: To a mechanically stirred tank or vessel is added 34.66 g of deionised water (conductivity less than 25 microSiemens), and 3.62 g of Bykjet 9171 (Altana) (Non-ionic block co-polymer with aminic pigment affinic groups) and the two components mixed using stirring for a few minutes at ambient temperature. 3.62 g of SYN-THRO®-PON W 599 (Synthron) (Non-ionic dispersant) was added, followed by 5.05 g of a solution of 35.00 g of Oparyl DT505 (Bozzetto) (methylnaphthalene sulfonate) in 65.00 g of deionised water is added and the mixture continued to be stirred at ambient temperature. Glycerine pharma grade (Brenntag) 6.74 g is then added, followed by Byk LPD23651 defoamer (0.13 g) and Ebotec MB biocide (0.07 g) are then added with continual stirring of the mixture. The pigment powder, Disperse Orange 25, 13.50 g is then added slowly to the tank with continued stirring. The resulting mixture is stirred for 45 minutes and then mixed under high shear conditions for a further 60 minutes. The mixture is then pumped into an Retsch mill and the process of milling is started. After 4 hours, the milling is deemed complete, and the dispersion is pumped back into a mechanically stirred tank and 32.60 g of deionised water is added. After mixing for a few minutes, the dispersion is pumped from the mill and stored. The physical properties of the dispersion were measured to give a particle size Z-average 97 nm, Dv50 77 nm, Dv95 199 nm (measured using a Malvern Zetasizer Nano-ZS). Demonstrated much improved stability and similar filter time to baseline dispersions 1a-1c.

Example 16a—Comparative Non-Ionic Dispersant (NI) Plus Alkylnaphthalene Sulfonate (ANS) Plus Amine Functional Dispersant (AF)

16a. Dispersion: To a mechanically stirred tank or vessel is added 34.66 g of deionised water (conductivity less than 25 microSiemens), and 3.62 g of Bykjet 9171 (Altana) (Non-ionic block co-polymer with aminic pigment affinic groups) and the two components mixed using stirring for a few minutes at ambient temperature. 3.62 g of SYN-THRO®-PON W599 (Synthron) (Non-ionic dispersant) was added, followed by 5.05 g of a solution of 35.00 g of Morwet D425 (Nouryon) (Alkylnapthalenesulfonate where the alkyl group is not hydrogen, methyl or ethyl) in 65.00 g of deionised water is added and the mixture continued to be stirred at ambient temperature. Glycerine pharma grade (Brenntag) 6.74 g is then added, followed by Agitan 731 defoamer (0.13 g) and Ebotec MB biocide (0.07 g) are then added with continual stirring of the mixture. The pigment powder, Disperse Orange 25, 13.50 g is then added slowly to the tank with continued stirring. The resulting mixture is stirred for 45 minutes and then mixed under high shear conditions for a further 60 minutes. The mixture is then pumped into an Retzch mill and the process of milling is started. After 4 hours, the milling is deemed complete, and the dispersion is pumped back into a mechanically stirred tank and 32.60 g of deionised water is added. After mixing for a few minutes, the dispersion is pumped from the mill and stored. The physical properties of the dispersion were measured to give a particle size Z-average 105 nm, Dv50 78 nm, Dv95 224 nm (measured using a Malvern Zetasizer Nano-ZS). Demonstrated much improved stability but poorer filter time to baseline dispersions 1a-1c.

Example 17a—Inventive Non-Ionic Dispersant (NI) Plus Alkylnaphthalene Sulfonate (ANS) Plus Amine Functional Dispersant (AF) Using a Different Defoamer 17a. Dispersion: To a mechanically stirred tank or vessel is added 34.66 g of deionised water (conductivity less than 25 microSiemens), and 5.07 g of Bykjet 9171 (Altana) (Non-ionic block co-polymer with aminic pigment affinic groups) and the two components mixed using stirring for a few minutes at ambient temperature. 2.17 g of SYN-THRO®-PON W599 (Synthron) (Non-ionic dispersant) was added, followed by 5.05 g of a solution of 35.00 g of Oparyl DT505 (Bozzetto) (methylnaphthalene sulfonate) in 65.00 g of deionised water is added and the mixture continued to be stirred at ambient temperature. Glycerine pharma grade (Brenntag) 6.74 g is then added, followed by Byk LPD23651 defoamer (0.13 g) and Ebotec MB biocide (0.07 g) are then added with continual stirring of the mixture. The pigment powder, Disperse Orange 25, 13.50 g is then added slowly to the tank with continued stirring. The resulting mixture is stirred for 45 minutes and then mixed under high shear conditions for a further 60 minutes. The mixture is then pumped into an Retzch mill and the process of milling is started. After 4 hours, the milling is deemed complete, and the dispersion is pumped back into a mechanically stirred tank and 32.60 g of deionised water is added. After mixing for a few minutes, the dispersion is pumped from the mill and stored. The physical properties of the dispersion were measured to give a particle size Z-average 89 nm, Dv50 69 nm, Dv95 189 nm (measured using a Malvern Zetasizer Nano-ZS). Demonstrated much improved stability and similar filter time to baseline dispersions 1a-1c.

Example 17b—Inventive Ink Formulation—Non-Ionic Dispersant (NI) Plus Alkylnaphthalene Sulfonate (ANS) Plus Amine Functional Dispersant (AF)

1d. Ink: To a mechanically stirred tank or vessel using a saw tooth impeller is added 34.00 g of dispersion from Example 17a; 13.87 kg of deionised water (conductivity less than 25 microSiemens); 14.50 g of glycerine pharma grade (Brenntag); 26.0 g of monopropylene glycol; 0.2 g of triethylamine 99%; 2.00 g of solution of 33.00 g of Joncryl EC0675 and 19.50 g of TEA 99% and 0.20 g of Agitan 731 and 0.09 g of Preventol D7 in 47.21 g of deionised water ; 9.00 g of Tego Disperse 750 W (Evonik); 0.3 g of Dynol 607; 0.03 g of Preventol D7; 0.1 g of Ebotec MB. The mixture is stirred for a 45 mins following complete addition of the liquids and then pumped through a cascade 1-micron polypropylene (absolute) depth filter+1-micron glass fiber (absolute) filter+0.6-micron polypropylene (absolute) filter to afford the finished ink. The physical properties of the ink were measured to give a viscosity of 11.35 cP (measured at 23° C. at low shear using a ThermoHaake Rheostress 1); pH 7.8 (measured at 25° C. using a WTW pH-Electrode SenTix 81); conductivity 0.598 mScm-1 (measured at 25° C. using a WTW Tetra-Con 325); Static surface tension (measured using SITA tensiometer with O-ring), 34.5 mNm-1 (measured at 25° c); particle size Z-average 120 nm, Dv50 99 m, Dv95 293 nm (measured using a Malvern Zetasizer Nano-ZS). Demonstrated much improved stability and performance to the baseline ink 1d.

Analysis

Molecular Weight

The molecular weight of non-polymeric or oligomeric compounds (i.e. defined monomeric species) is defined and calculated by the molecular structure of the compound. Usually, this is given by the supplier technical data sheet of the monomer or can be found on the webpage of the European Chemical Agency (ECHA).

Oligomeric and polymeric species typically comprise a distribution of chain lengths and thus a distribution of molecular weights. Accordingly, the molecular weight of oligomeric and polymeric species is calculated via Gel Permeation Chromatography (GPC) using a Polymer Lab GPC50 system with two PL Gel columns (10 μm; 7.5 mm×300 mm, Agilent, Santa Clara, USA) and a refractive index detector (differential refractometer). The mobile phase is THF at 35° C. with a flow rate of 1 ml/min. The molecular weight is calculated by comparison with a polystyrene standard. Unless otherwise stated, polymer molecular weight is given as the number average molecular weight.

Amine Value

The mass equivalent of potassium hydroxide that is required when one gram of substance is neutralized with a suitable acid (typically hydrochloric acid). The amine value is determined in accordance with standard test method DIN53176-2002.

All of the inventive Examples 1a-17a dispersions and example 1d and 17b inks were tested for the following properties to show their suitability for use as dispersions and for use in inkjet inks.

Storage Stability as Determined by Particle Size and Turbiscan Rating

All of the Example 1a-17a dispersions; and 1d, 17b inks were tested for storage stability by storing the ink samples in glass vials (30 mL) for periods of time at 50° C. The physical properties listed in the examples were measured on a weekly basis—see Table 1 & 2. A passing result for change in Dv50 is ≤40% from the original result after 28 days. A passing result for change in Dv95 is ≤25% from the original result after 28 days. Inventive Example 15a and 17a dispersions all exhibited excellent stability results 28 days at 50° C. This equates to a product shelf-life of approximately 52 weeks at normal storage conditions (15-30° C.).

Particle size measurement method with Malvern Zetasizer nano S90 or ZS90: in a small beaker, add 2 drops of dispersion with a pipette and add 15 ml of deionized water; mix well. Put 1 drop of this solution in a cuvette and fill with deionized water; mix well without air bubbles. Place the cuvette in the device. Three measurements are made by the device and then the 3 measurements checked for the particle size distribution graph. Record the average value of Z_average, Dv50, and DV90.

Turbiscan rating test method with Turbiscan LAB (Formulaction): With a pipette fill in the Turbiscan flask with the dispersion. Be careful to avoid any air bubbles or foam. Place the sample in the device and start the scan. Then place the sample in oven and start incubation for 4 weeks @ 35° c. Make a measurement after 1 day, 7 days, 14 days, 21 days, 28 days. Interpretation of curves: Select Delta tab and check delta R % (backscattering), we consider an acceptable backscattering (Turbiscan rating) at maximum ±13.

TABLE 1

Stability (measured by Turbiscan and Dv50 particle size) of the Inventive Dispersions

| Dispersion Example | Turbiscan Rating (28 days, 35° C.) | Malvern Test Particle size change (%) Dv50 after 28 days (50° C.) | Dispersant Type(s) |
|---|---|---|---|
| 1a | 11 | 105.3% (7 days) | NI + ANS |
| 2a | 14 | 54.0% | AF + ANS |
| 3a | 15.5 | 70.6% | AF + ANS |
| 4a | 18 | 157.5% | AF + ANS |
| 5a | 4 | 8.4% | NI + ANS |
| 6a | 9 | 36.0% | NI + ANS |
| 7a | 8.5 | 33.8% | NI + SLS |
| 8a | 10 | 26.4% | NI + ANS |
| 9a | 9 | 36.0% | NI + ANS |
| 10a | −10 | NA | NI + ANS |
| 11a | 5 | NA | NI + ANS |
| 12a | 10 | 54.8% | NI + ANS |
| 13a | 5 | NA | AS + ANS |
| 14a | −5 | NA | NI + ANS |
| 15a | 11 | 14.3% | NI + AF + ANS |
| 16a | 9 | 37.2% | NI + AF + ANS |
| 17a | 10 | 24.6% | NI + AF + ANS |

Key to Dispersant Types:
ANS = Alkylnaphthalene sulphonate type;
AF = Amine-functional non-ionic dispersant;
NI = Non-ionic dispersant;
SLS = Sodium Lignosulfonate;
AS = Anionic Surfactant Table 1 demonstrates the excellent stability of the inventive dispersion 15a and 17a.

TABLE 2

Stability (measured by Turbiscan and Dv95 particle size) of the Inventive Dispersions

| Dispersion or Ink Example | Turbiscan Rating at 28 days/35° C. | Particle size change (%) Dv95 after 28 days at 50° C. | Dispersant Type(s) |
|---|---|---|---|
| 1a | 11 | 118.2% (7 days) | NI + ANS |
| 2a | 14 | 78.4% | AF + ANS |
| 3a | 15.5 | 75.8% | AF + ANS |
| 4a | 18 | 149.6% | AF + ANS |
| 5a | 4 | 8.5% | NI + ANS |
| 6a | 9 | 33.2% | NI + ANS |
| 7a | 8.5 | 24.2% (21 days) | NI + SLS |
| 8a | 10 | 32.2% | NI + ANS |
| 9a | 9 | 33.2% | NI + ANS |
| 10a | −10 | NA | NI + ANS |
| 11a | 5 | NA | NI + ANS |
| 12a | 10 | 51.7% | NI + ANS |
| 13a | 5 | NA | AS + ANS |
| 14a | −5 | NA | NI + ANS |
| 15a | 11 | 23.6% | NI + AF + ANS |
| 16a | 9 | 16.1% | NI + AF + ANS |
| 17a | 10 | 20.1% | NI + AF + ANS |

Table 2 further demonstrates the excellent stability of the inventive dispersion 15a and 17a.

TABLE 3

Z average particle size (nm) of dispersions.

| Example | Initial Z-ave particle size (nm) | Z-ave particle size (28 days/50° C.) | % Change* |
|---|---|---|---|
| 1a | 94 | 151 | +61% |
| 2a | 78 | 121 | +55% |
| 3a | 85 | 133 | +56% |
| 4a | 107 | 215 | +50% |
| 5a | 143 | 159 | +11% |
| 6a | 105 | 140 | +25% |
| 7a | 96 | 121 | +26% |
| 8a | 110 | 143 | +30% |
| 9a | 105 | 140 | +33% |
| 10a | 200 | NA | |
| 11a | 239 | NA | |
| 12a | 130 | 181 | +39% |
| 13a | 206 | NA | |
| 14a | 257 | NA | |
| 15a | 97 | 123 | +27% |
| 16a | 105 | 124 | +18% |
| 17a | 89 | 110 | +23% |

*A Z-ave particle size change of ≤30% is considered a passing result

Table 3 further demonstrates the excellent stability of the inventive dispersions 15a and 17a.

Filterability

Filtration test method with lab glass filtration set: Place a fresh GF/B 1 micron/15 mm filter (Whatman) filter paper onto the filter mesh of the Erlenmeyer vacuum filtration flask. The vacuum pump is started to apply −400 mb of vacuum to the filtration apparatus. The liquid delivery flask is filled above filter with 30 mL of the trial dispersion or ink and the time for the dispersion sample to pass through the filter is recorded. ≤60 seconds is considered a passing result and demonstrates that there is a uniform distribution of particles. In general, large particles remaining can block the filter and lead to slow filter times and fine particles can de-stabilize the dispersions and lead to clogging of the filters also from agglomeration of uncoated colorant particles.

TABLE 4

Filter time tests for dispersions and inks

| Dispersion or Ink Example | Filtration Time (seconds) | Dispersant Type(s) |
|---|---|---|
| 1a | 15 | NI + ANS |
| 2a | 55 | AF + ANS |
| 3a | 62 | AF + ANS |
| 4a | 33 | AF + ANS |
| 5a | Clogged | NI + ANS |
| 6a | 17 | NI + ANS |
| 7a | 10 | NI + SLS |
| 8a | 180 | NI + ANS |
| 9a | 17 | NI + ANS |
| 10a | NA | NI + ANS |
| 11a | NA | NI + ANS |
| 12a | 180 | NI + ANS |
| 13a | NA | AS + ANS |
| 14a | NA | NI + ANS |
| 15a | 19 | NI + AF + ANS |
| 16a | Clogged | NI + AF + ANS |
| 17a | 23 | NI + AF + ANS |

The inks 1d and 17b were loaded into the ink system and the inks printed using the same Ricoh Gen5 heated at 30° C., the environmental conditions were temperature of 21-23° C. and relative humidity of 48%. The prints demonstrated a brighter and more colored definition from the novel ink formulation 17b over the base ink formulation 1d. The photograph of the baseline ink 1d, seen on the left side, is compared with the inventive ink 17b, seen on the right side. The picture on the right side shows the open time is better because there are fewer missing nozzles on start-up at the bottom of each bar of color compared to the picture on the left side. Furthermore, on the left side, nozzles/print is missing after 6 minutes of dwell time, but the right side is not showing these defects.

Definitions

Good jetting and printed image quality is defined as adequate drop formation when ejected from a digital inkjet head at different drop volumes. There should be no satellites or drop break up which can be detrimental to the printed image quality, usually verified by jet testing on a drop watcher machine such as those from X-Rite. Good, printed image quality is defined as the image being compliant with the end use application. Usually verified using a series of tests such as line straightness, wicking, feathering, dot gain, etc. on an ImageXpert from Xrite.

Storage stability is the number of days, weeks or months that an ink can be stored without any significant settling or degradation which may lead to poorer performance of the inks.

Filterability: is the time in seconds for which a fixed volume of ink passes through a standard filtration glass fibre disc under constant vacuum. A filtration time of less than 120 seconds is acceptable.

Open time is the time by which a print head can be left uncapped (hence open) and then when jetting is recommenced, a complete start-up of all nozzles. Normal open times are at least one hour.

The invention claimed is:

1. A printing ink or pigment dispersion composition comprising a water-insoluble azo-functional colorant; at least two different functionality non-ionic dispersants; and an alkylnaphthalene sulfonate anionic surfactant with the alkyl being hydrogen, methyl or ethyl;
wherein at least one of the at least two different functionality non-ionic dispersants is a first non-ionic polymer comprising water-solubilizing polar groups selected from the group consisting of carboxylic acid or carboxylic acid salts, sulfonic acid, sulfonic acid salts and combinations thereof;
wherein at least one of the at least two different functionality non-ionic dispersants is a second non-ionic polymer comprising glycol repeating units and amine-rich repeating units;
wherein the second non-ionic polymer is a block copolymer comprising at least a first block and a second block;
wherein the first block is a polyether based on ethylene glycol or propylene glycol repeating units and the second block is a poly(meth)acrylate comprising substituent amine groups;
wherein the alkylnaphthalene sulfonate anionic surfactant has the following structure:

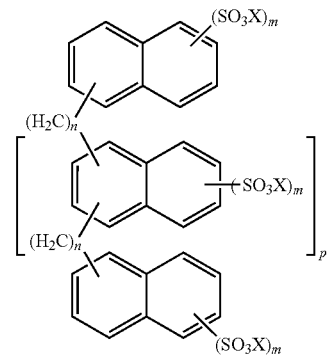

wherein n is 0, 1, or 2; m is 0 or 1 with the proviso that at least one m is 1; p is between 0 and 10; and X is any suitable cation.

2. The composition of claim 1, further comprising organic co-solvent, a rheology-modifying polymer, water, surfactant and a pH adjustment agent.

3. The composition of claim 2, wherein the water-insoluble azo-functional colorant is a disperse dye, a sublimation dye or a solvent dye.

4. The composition of claim 3, wherein the colorant is a disperse dye selected from the group consisting of Disperse Orange 25, Disperse Orange 30, Disperse Brown 27, Disperse Violet 43, or any other disperse dye containing at least one azo-linkage and combinations thereof.

5. The composition of claim 4, wherein the second non-ionic dispersing agent is capable of coordinating divalent and/or trivalent metal ions.

6. The composition of claim 5, wherein the second non-ionic polymer has an amine value of greater than 10 mg KOH/g.

7. The composition of claim 1, wherein p is either 0 or 1; n is 0 or 1; and X is selected from the group consisting of $Li^+$, $Na^+$, or $K^+$.

8. The composition of claim 7, wherein the number average molecular weight of the non-ionic dispersing agents is above 1,000 Da.

9. The composition of claim 8, comprising colorant particles which are at least Dv50 100-500 nm in diameter.

10. The composition of claim 9, wherein the first and second non-ionic dispersing agents are each present, independently, in an amount of between 0.01 wt % and 20 wt %.

11. The composition of claim 10, wherein the alkylnaphthalene sulfonate anionic surfactant is present in an amount of between 0.01 wt % and 10 wt %.

12. The composition of claim 2, comprising water and optionally an organic co-solvent, wherein water and the optional organic co-solvent are present in a combined amount between 10wt % and 90wt %.

13. The composition of claim 1, comprising 0.1-25.0 wt % of a water-insoluble azo-functional colorant, 0.1-10.0 wt % of the first non-ionic dispersant, 0.1-10 wt % of the second non-ionic dispersant and 0.1-10 wt % of the alkylnaphthalene sulfonate anionic surfactant; 0.1-30 wt % of an organic co-solvent; 0.01-5.0 wt % of an anti-foam agent; 0.001-0.5 wt % of a biocide and the remainder of the formulation is water.

14. A method for printing, comprising applying the ink of claim 1 onto a substrate and curing.

15. The method of claim 14, wherein the method of printing is inkjet.

16. The method of claim 15, wherein the ink is printed onto a transfer paper.

17. The method of claim 16, wherein the ink is printed directly onto a textile fabric.

* * * * *